(12) United States Patent
Yonekubo et al.

(10) Patent No.: US 9,885,877 B2
(45) Date of Patent: Feb. 6, 2018

(54) IMAGE DISPLAY APPARATUS HAVING AN OPTICAL SCANNER

(71) Applicant: Seiko Epson Corporation, Tokyo (JP)

(72) Inventors: Masatoshi Yonekubo, Hara (JP); Daisuke Ishida, Chino (JP)

(73) Assignee: Seiko Epson Corporation (JP)

( * ) Notice: Subject to any disclaimer, the term of this patent is extended or adjusted under 35 U.S.C. 154(b) by 128 days.

(21) Appl. No.: 14/960,792

(22) Filed: Dec. 7, 2015

(65) Prior Publication Data

US 2016/0161755 A1  Jun. 9, 2016

(30) Foreign Application Priority Data

Dec. 8, 2014 (JP) ................................. 2014-248119

(51) Int. Cl.
*G02B 27/01* (2006.01)
*G02B 27/42* (2006.01)
(Continued)

(52) U.S. Cl.
CPC ....... *G02B 27/4227* (2013.01); *G02B 6/0026* (2013.01); *G02B 26/10* (2013.01); *G02B 27/0081* (2013.01); *G02B 27/0172* (2013.01); *G02B 27/0176* (2013.01); *G02B 27/4272* (2013.01); *G06F 3/012* (2013.01);
(Continued)

(58) Field of Classification Search
CPC .......................... G02B 27/01–27/0189; G02B 2027/0105–2027/0198
See application file for complete search history.

(56) References Cited

U.S. PATENT DOCUMENTS

RE41,374 E * 6/2010 Wine ................. G02B 26/0841
250/235
8,810,913 B2 * 8/2014 Simmonds ......... G02B 27/0172
359/631
(Continued)

FOREIGN PATENT DOCUMENTS

JP         4862298 B2    1/2012
JP       2014-078022 A   5/2014

OTHER PUBLICATIONS

Extended European Search Report for Patent Application No. EP15198007.5 dated Aug. 4, 2016 (6 pages).

*Primary Examiner* — Gene W Lee
(74) *Attorney, Agent, or Firm* — Harness, Dickey & Pierce, P.L.C.

(57) ABSTRACT

An image display apparatus includes an image light generator that generates video light modulated based on a video signal, a light diffracting section (first diffractive optical element) that diffracts the video light outputted from the image light generator, a light sweeper (optical scanner) that spatially scans the video light, and a reflector including a light diffracting section (second diffractive optical element) that diffracts the video light scanned by the light sweeper, and the light diffracting section (first diffractive optical element) is provided on an optical path between the image light generator and the light sweeper. The light diffracting section (first diffractive optical element) preferably has a fixed interval between interference fringes, and the light diffracting section (second diffractive optical element) preferably has portions where intervals between interference fringes differ from each other.

14 Claims, 12 Drawing Sheets

(51) Int. Cl.
*F21V 8/00* (2006.01)
*G02B 27/00* (2006.01)
*G06T 19/00* (2011.01)
*G06F 3/01* (2006.01)
*G02B 26/10* (2006.01)

(52) U.S. Cl.
CPC ...... *G06T 19/006* (2013.01); *G02B 2027/015* (2013.01); *G02B 2027/0123* (2013.01); *G02B 2027/0174* (2013.01)

(56) References Cited

U.S. PATENT DOCUMENTS

| | | | | |
|---|---|---|---|---|
| 8,837,050 | B2* | 9/2014 | Hudman | G02B 5/04 359/619 |
| 8,998,414 | B2* | 4/2015 | Bohn | G02B 5/20 351/210 |
| 9,519,146 | B2* | 12/2016 | Takeda | G02B 27/0172 |
| 2005/0264502 | A1* | 12/2005 | Sprague | G02B 5/10 345/84 |
| 2007/0171370 | A1 | 7/2007 | Watanabe | |
| 2007/0188837 | A1 | 8/2007 | Shimizu et al. | |
| 2010/0060551 | A1* | 3/2010 | Sugiyama | G02B 27/0172 345/8 |
| 2010/0097580 | A1* | 4/2010 | Yamamoto | G02B 26/101 353/69 |
| 2012/0032874 | A1 | 2/2012 | Mukawa | |
| 2013/0009853 | A1* | 1/2013 | Hesselink | G02B 27/017 345/8 |
| 2016/0178910 | A1* | 6/2016 | Giudicelli | G02B 27/0172 359/633 |

* cited by examiner

IMAGE DISPLAY APPARATUS HAVING AN OPTICAL SCANNER

BACKGROUND

1. Technical Field

The present invention relates to an image display apparatus.

2. Related Art

A head mounted display (HMD) has been known as a display apparatus that directly irradiates the retinae of a user's eyes with laser light to allow the user to visually recognize an image.

A head mounted display typically includes a light emitting apparatus that outputs light and a sweeper that changes the optical path of the outputted light in such a way that the user's retinae are scanned with the outputted light. The thus configured head mounted display allows the user to visually recognize, for example, both an outside scene and an image drawn with the sweeper at the same time.

For example, JP-A-2014-78022 discloses an image display apparatus including a light source, a sweeper that sweeps parallelized light emitted from the light source, and an optical apparatus that relays the parallelized light swept with the sweeper and outputs the relayed light toward a user's eyes. JP-A-2014-78022 further discloses that among the components of the image display apparatus, the optical apparatus includes a light guide plate configured to cause light incident thereon to propagate therethrough while undergoing total reflection and then exit out thereof, a first diffraction grating member that diffracts the light incident on the light guide plate in such a way that the incident light undergoes total reflection, and a second diffraction grating member that diffracts the light having propagated while undergoing total reflection in such a way that the light is allowed to exit out of the light guide plate.

The image display apparatus described in JP-A-2014-78022 is, however, so configured that the light swept with the sweeper is incident on the first diffraction grating member. Since the light incident on the first diffraction grating member is the light having been swept over a two-dimensional sweep range having a fixed area, the first diffraction grating member needs to be large enough to receive the light. As a result, the image display apparatus described in JP-A-2014-78022 inevitably has a large size.

SUMMARY

An advantage of some aspects of the invention is to provide an image display apparatus capable of performing high-image-quality display with a suppressed diffraction-induced shift of the angle of diffraction while suppressing an increase in size of the apparatus.

The invention can be implemented as follows.

An image display apparatus according to an aspect of the invention includes an image light generator that generates video light modulated based on a video signal, a first diffractive optical element that diffracts the video light outputted from the image light generator, an optical scanner that spatially scans the video light, and a second diffractive optical element on which the video light scanned by the optical scanner is incident and which diffracts the incident video light, and the first diffractive optical element is provided on an optical path between the image light generator and the optical scanner.

According to the aspect of the invention, an increase in the size of the apparatus can be suppressed because the first diffractive optical element is allowed to be compact, and a shift of the angle of diffraction produced when diffraction occurs can be suppressed, whereby an image display apparatus capable of high-image-quality display can be provided.

In the image display apparatus according to the aspect of the invention, it is preferable that the second diffractive optical element has a surface on which the video light is incident, and that the surface has a concave shape in a direction perpendicular to a diffraction grating of the second diffractive optical element.

In the configuration described above, the second diffractive optical element has a function equivalent to a converging lens, which means that the function of causing the video light to converge toward a viewer's eyes is enhanced. As a result, the viewer is allowed to visually recognize video images having a large angle of view and high image quality.

In the image display apparatus according to the aspect of the invention, it is preferable that the optical scanner performs primary scanning of the video light along a first direction and secondary scanning of the video light along a second direction perpendicular to the first direction, that the first diffractive optical element has a fixed diffraction grating cycle, and that the second diffractive optical element has portions where diffraction grating cycles differ from each other on a scan line of the primary scanning that passes through the center of the secondary scanning of the video light to be incident on the second diffractive optical element.

In the configuration described above, the video light having been two-dimensionally swept and projected on the second diffractive optical element can be so diffracted by the second diffractive optical element that the diffracted video light is incident on the viewer's eyes, whereby the viewer is allowed to visually recognize video images having a large angle of view and high image quality.

In the image display apparatus according to the aspect of the invention, it is preferable that the diffraction grating cycle of the first diffractive optical element is an intermediate value between a maximum diffraction grating cycle and a minimum diffraction grating cycle on the scan line of the primary scanning that passes through the center of the secondary scanning of the video light to be incident on the second diffractive optical element.

In the configuration described above, an angle width of the angle of diffraction produced in the diffraction that occurs in the first diffractive optical element can be sufficiently canceled roughly over the entire second diffractive optical element in the diffraction that occurs in the second diffractive optical element.

In the image display apparatus according to the aspect of the invention, it is preferable that the diffraction grating cycle of the first diffractive optical element is equal to the diffraction grating cycle not only on the scan line of the primary scanning that passes through the center of the secondary scanning of the video light to be incident on the second diffractive optical element but also in a position of the center of the primary scanning.

In the configuration described above, an angle width of the angle of diffraction produced in the diffraction that occurs in the first diffractive optical element can be sufficiently canceled roughly over the entire second diffractive optical element in the diffraction that occurs in the second diffractive optical element.

In the image display apparatus according to the aspect of the invention, it is preferable that the diffraction grating cycle of the first diffractive optical element is equal to the average of the diffraction grating cycles on the scan line of the primary scanning that passes through the center of the secondary scanning of the video light to be incident on the second diffractive optical element.

In the configuration described above, an angle width of the angle of diffraction produced in the diffraction that occurs in the first diffractive optical element can be sufficiently canceled roughly over the entire second diffractive optical element in the diffraction that occurs in the second diffractive optical element.

In the image display apparatus according to the aspect of the invention, it is preferable that the direction in which the diffraction grating of the second diffractive optical element extends is perpendicular to the first direction.

In the configuration described above, an angle width of the angle of diffraction produced in the diffraction that occurs in the first diffractive optical element can be reliably canceled in the diffraction that occurs in the second diffractive optical element.

It is preferable that the image display apparatus according to the aspect of the invention further includes a pupil expander optical system provided on an optical path between the optical scanner and the second diffractive optical element.

In the configuration described above, the light beam width (cross-sectional area) of the video light can be expanded, whereby the visibility of the video light can be increased.

BRIEF DESCRIPTION OF THE DRAWINGS

The invention will be described with reference to the accompanying drawings, wherein like numbers reference like elements.

FIGS. 8A to 8D show a schematic configuration of an optical element shown in FIG. 3, in which FIG. 8A is a front view, FIG. 8B is a plan view, FIG. 8C is a right side view, and FIG. 8D is a left side view.

DESCRIPTION OF EXEMPLARY EMBODIMENTS

Image display apparatus according to preferable embodiments of the invention will be described below in detail with reference to the accompanying drawings.

First Embodiment

An image display apparatus according to a first embodiment of the invention will first be described.

Figure 1:
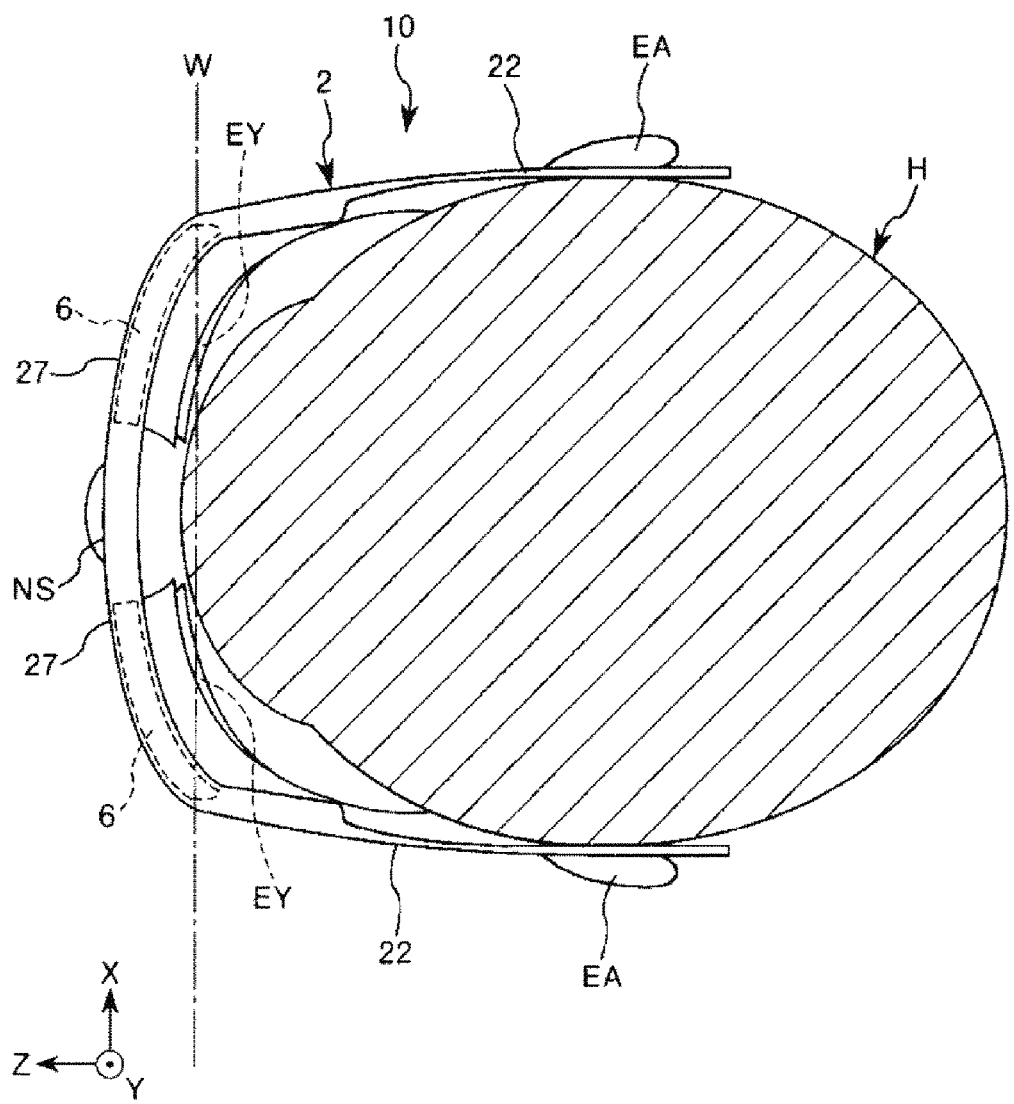
FIG. 1 shows a schematic configuration of a head mounted display including an image display apparatus according to a first embodiment of the invention.
Figure 2:
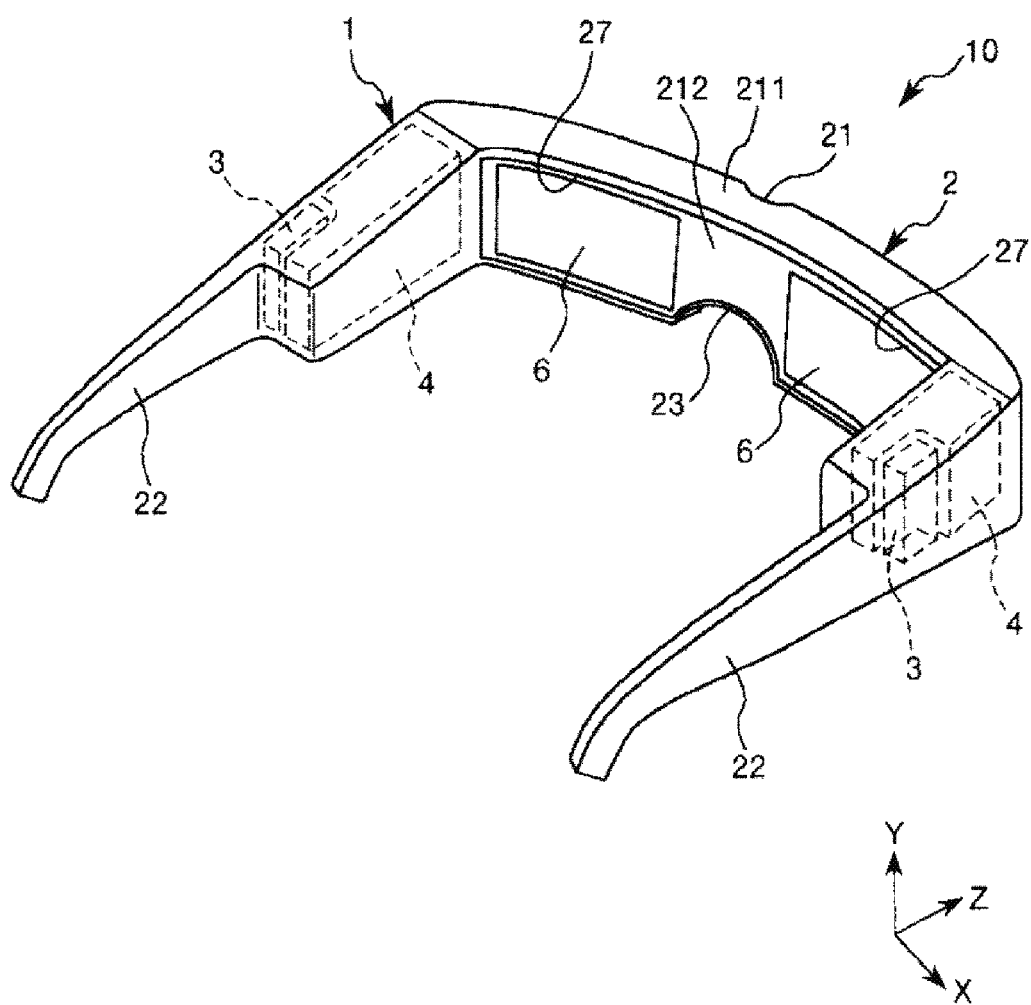
FIG. 2 is a schematic perspective view of the head mounted display shown in FIG. 1.
Figure 3:
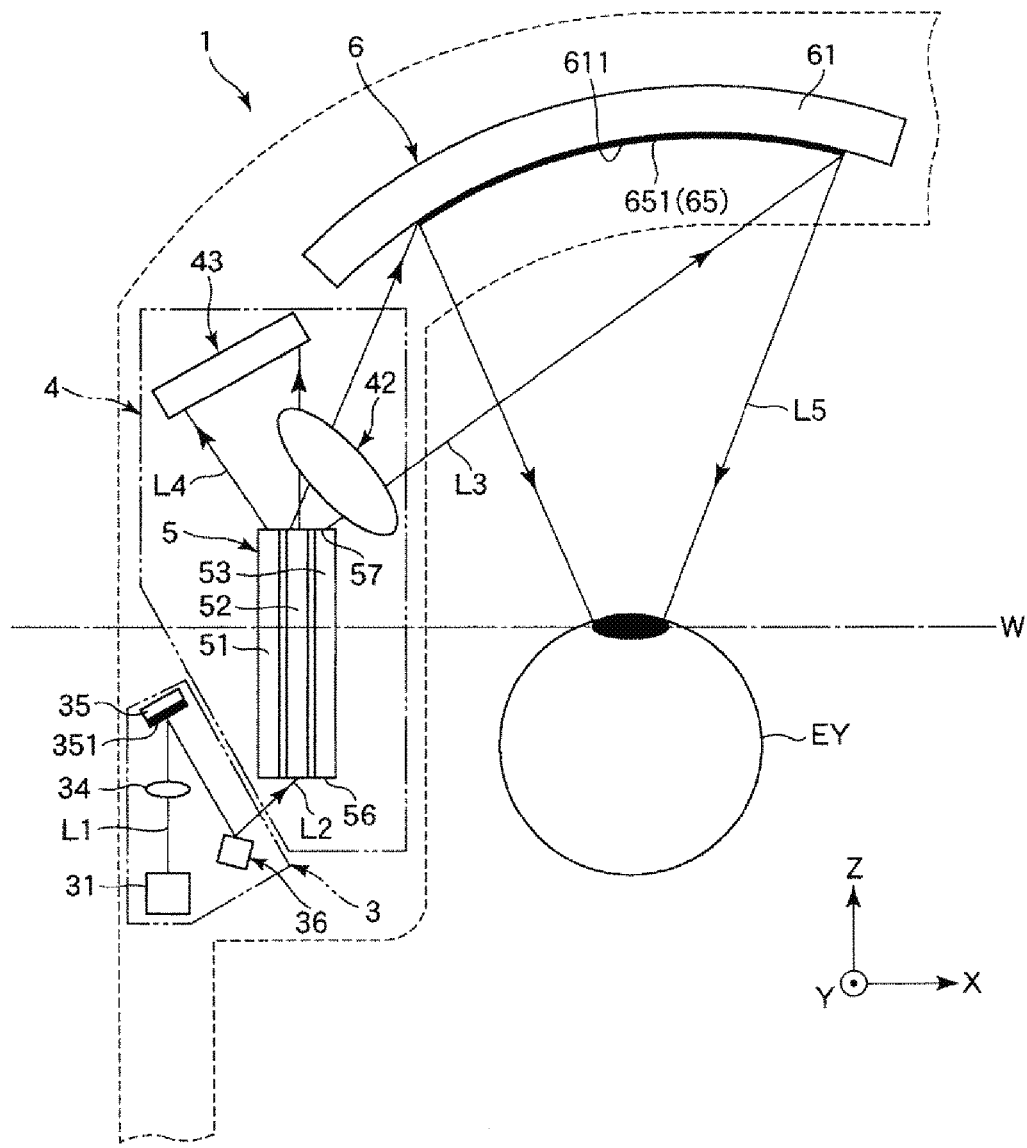
FIG. 3 diagrammatically shows the configuration of the image display apparatus shown in FIG. 1.
Figure 4:
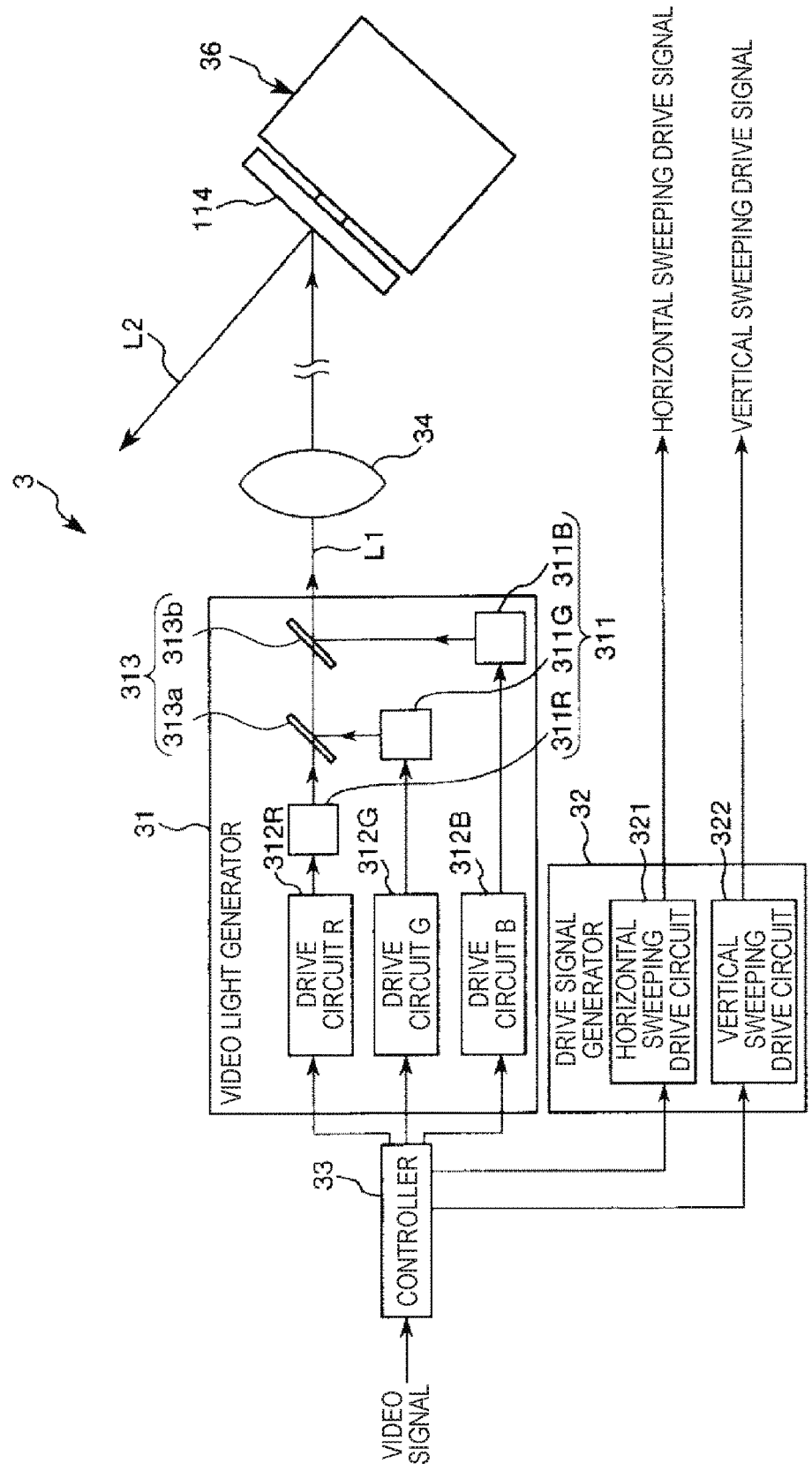
FIG. 4 diagrammatically shows the configuration of an image generator shown in FIG. 2.
Figure 5A:
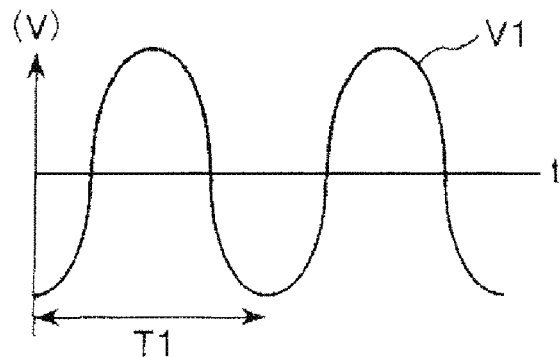
FIGS. 5A and 5B show an example of drive signals generated by a drive signal generator shown in FIG. 4.
Figure 5B:
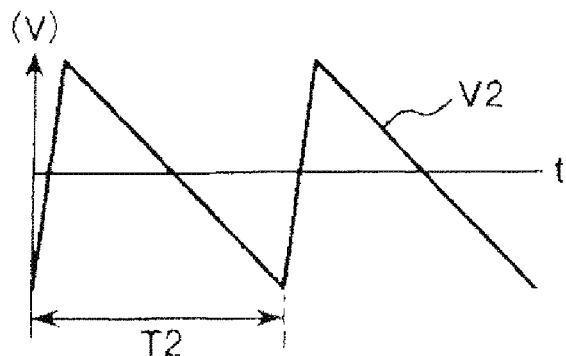
Figure 6:
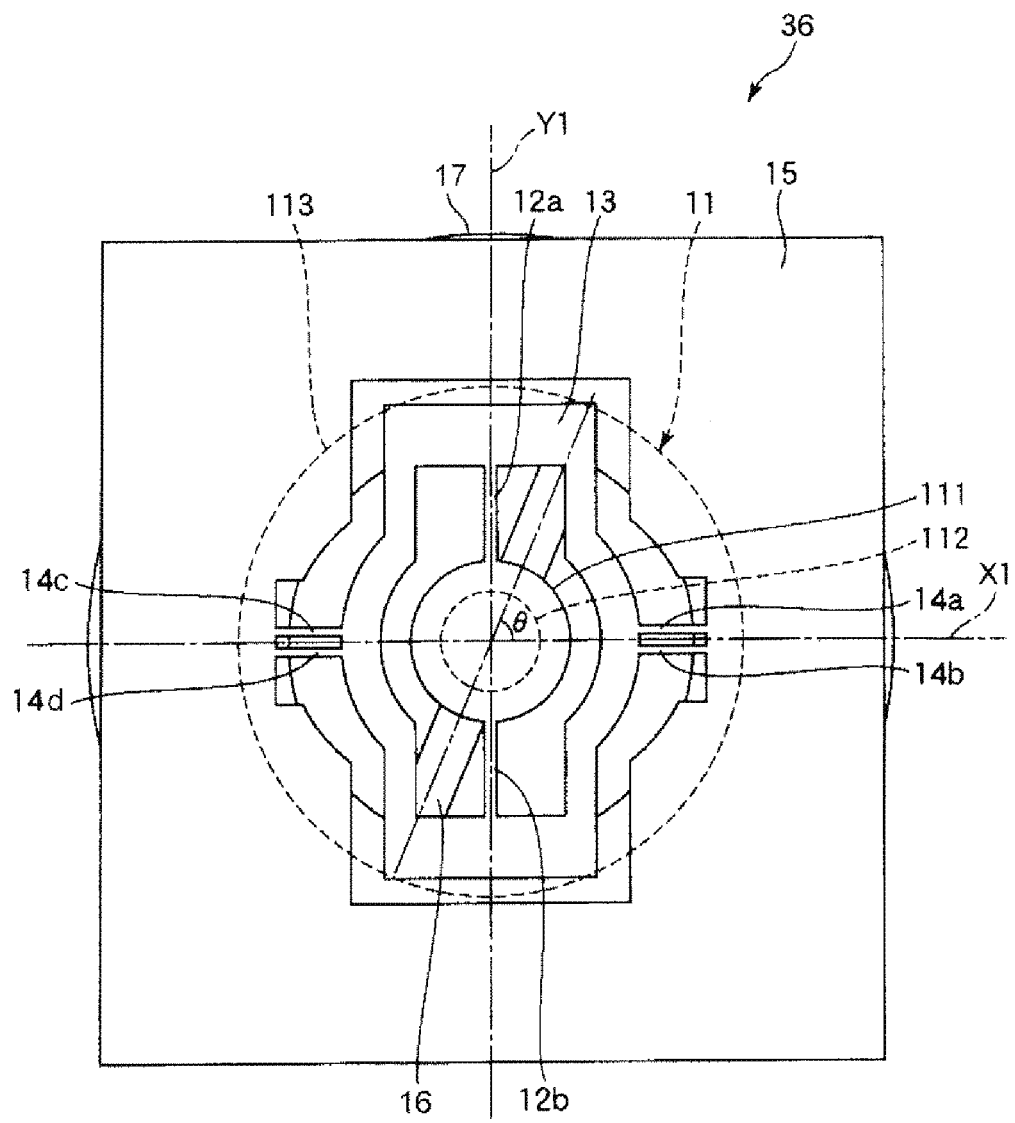
FIG. 6 is a plan view of a light sweeper shown in FIG. 4.
Figure 7:
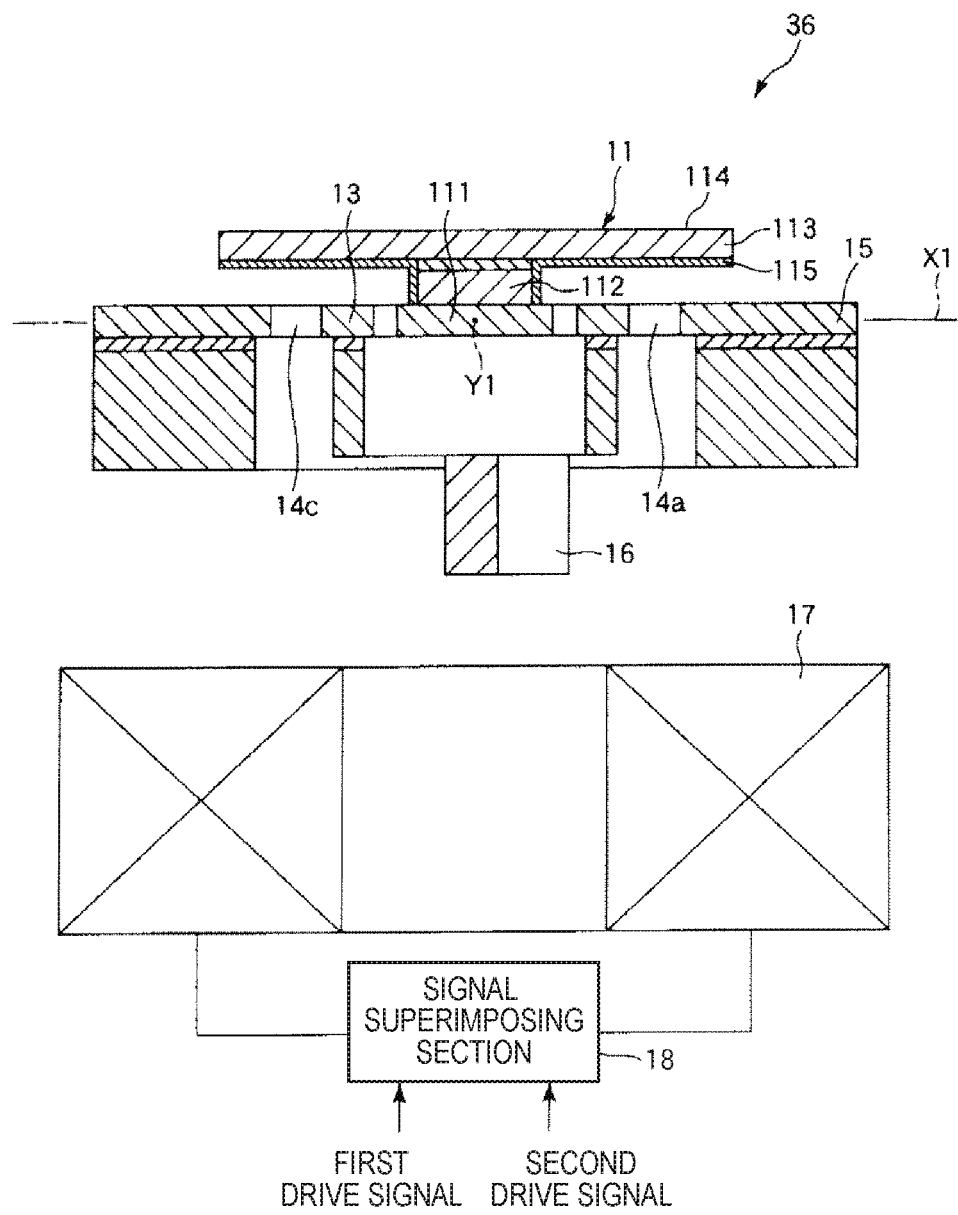
FIG. 7 is a cross-sectional view of the light sweeper shown in FIG. 6 (cross-sectional view taken along X1 axis).
Figure 8:
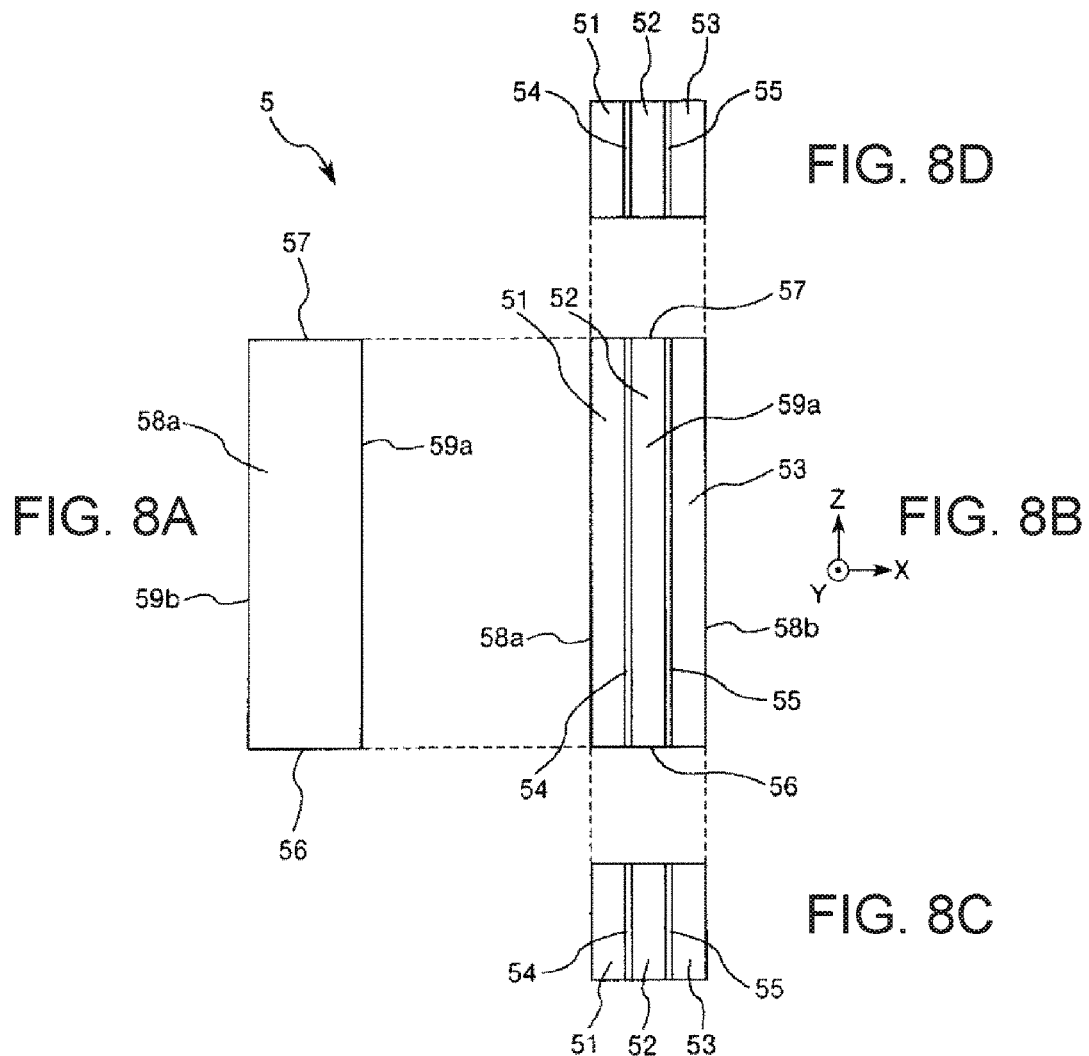
Figure 9:
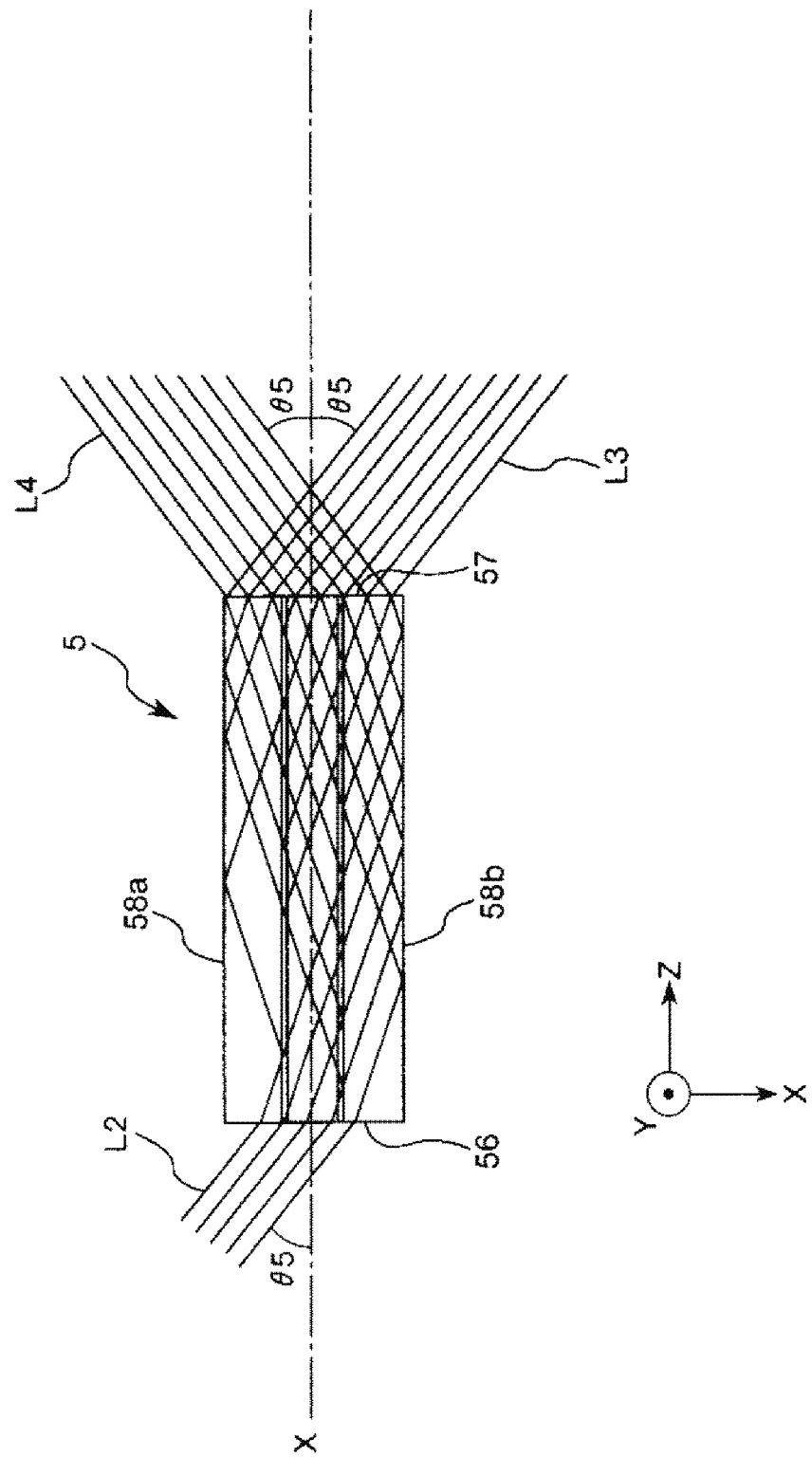
FIG. 9 describes the path of video light incident on the optical element shown in FIGS. 8A to 8D.

FIG. 1 shows a schematic configuration of a head mounted display including the image display apparatus according to the first embodiment of the invention. FIG. 2 is a schematic perspective view of the head mounted display shown in FIG. 1. FIG. 3 diagrammatically shows the configuration of the image display apparatus shown in FIG. 1. FIG. 4 diagrammatically shows the configuration of an image generator shown in FIG. 2. FIGS. 5A and 5B show an example of drive signals from a drive signal generator shown in FIG. 4. FIG. 6 is a plan view of a light sweeper shown in FIG. 4. FIG. 7 is a cross-sectional view of the light sweeper shown in FIG. 6 (cross-sectional view taken along X1 axis). FIGS. 8A to 8D show a schematic configuration of an optical element shown in FIG. 3, in which FIG. 8A is a front view, FIG. 8B is a plan view, FIG. 8C is a right side view, and FIG. 8D is a left side view. FIG. 9 describes the path of video light incident on the optical element shown in FIGS. 8A to 8D.

FIGS. 1 to 3 show an X axis, a Y axis, and a Z axis as three axes perpendicular to one another for ease of description. It is assumed that the front end side of each illustrated arrow is represented by a "+ (positive)" sign and the base end side of the arrow is represented by a "− (negative)" sign. It is further assumed that the direction parallel to the X axis is called an "X-axis direction," the direction parallel to the Y axis is called a "Y-axis direction," and the direction parallel to the Z axis is called a "Z-axis direction."

The X axis, the Y axis, and the Z axis are so set that when an image display apparatus 1 is worn around a viewer's head H, the X-axis direction coincides with the rightward/leftward direction of the head H, the Y-axis direction coincides with the upward/downward direction of the head H, and Z-axis direction coincides with the frontward/rearward direction of the head H.

A head mounted display 10 including the image display apparatus 1 according to the present embodiment has a spectacle-like exterior appearance and is worn around the viewer's head H for use, as shown in FIG. 1, to allow the viewer to visually recognize an image in the form of a virtual image with an outside image superimposed thereon.

The head mounted display 10 includes the image display apparatus 1, which includes an image generator 3, an expander optical system 4, and a reflector 6, and a frame 2, as shown in FIGS. 1 and 2.

In the head mounted display 10, the image generator 3 generates video light modulated based on a video signal, the expander optical system 4 expands the light beam width (cross-sectional area) of the video light, and the reflector 6 guides the video light expanded by the expander optical system 4 to the viewer's eyes EY. The viewer is thus allowed to visually recognize a virtual image according to the video signal.

In the head mounted display 10, the image generator 3, the expander optical system 4, and the reflector 6, with which the image display apparatus 1 is provided, are provided on the right and left sides of the frame 2 symmetrically (in a bilaterally symmetric manner) with respect to a YZ plane. The image generator 3, the expander optical system 4, and the reflector 6 provided on the right side of the frame 2 form a virtual image for the right eye, and the image generator 3, the expander optical system 4, and the reflector 6 provided on the left side of the frame 2 form a virtual image for the left eye.

In the present embodiment, the head mounted display 10 has a configuration in which the image generator 3, the expander optical system 4, and the reflector 6 are provided on the right and left sides of the frame 2 to form a virtual image for the right eye and a virtual image for the left eye, but the head mounted display 10 is not necessarily configured as described above. For example, the image generator 3, the expander optical system 4, and the reflector 6 may be provided only on the left side of the frame 2 to form only a virtual image for the left eye, or conversely, the image generator 3, the expander optical system 4, and the reflector 6 may be provided only on the right side of the frame 2 to form only a virtual image for the right eye. That is, the head mounted display 10 is not limited to the head mounted display 10 of the binocular type employed in the invention and may be a head mounted display of a monocular type.

Each of the components of the head mounted display 10 will be sequentially described below in detail.

The two image generators 3 have the same configuration and so do the two expander optical systems 4 and the two reflectors 6, and the image generator 3, the expander optical system 4, and the reflector 6 provided on the left side of the frame 2 will therefore be primarily described below.

Frame

The frame 2 has a spectacle-frame-like shape and has a function of supporting the image generators 3, the expander optical systems 4, and the reflectors 6, with which the image display apparatus 1 is provided, as shown in FIG. 2.

The frame 2 includes a front section 21, which has a rim 211 and a shade section 212, and temples 22, which extend from the right and left ends of the front section 21 in the Z-axis direction.

The shade section 212 is a member that has a function of suppressing transmission of outside light and supports the reflectors 6. The shade section 212 has inner-side recesses 27, which open toward the viewer, and the reflectors 6 are provided in the recesses 27. The shade section 212, which supports the reflectors 6, is then supported by the rim 211.

A nose pad 23 is provided in a central portion of the shape section 212. The nose pad 23 comes into contact with the viewer's nose NS when the viewer wears the head mounted display 10 around the head H, and the nose pad 23 supports the head mounted display 10 with respect to the viewer's head H.

Each of the temples 22 is a straight temple that does not have an angled portion that fits the viewer's ear EA and is so configured that part of the temple 22 comes into contact with the viewer's ear EA when the viewer wears the head mounted display 10 around the head H. Further, the temples 22 accommodate the image generators 3 and the expander optical systems 4 therein.

The temples 22 are not necessarily made of a specific material and can be made, for example, of a variety of resin materials, a composite material that is a mixture of a resin and carbon fibers, glass fibers, or any other fibers, or a metal material, such as aluminum and magnesium.

The frame 2 does not necessarily haves the shape shown in FIGS. 1 and 2 and can be shaped in any manner as long as the frame 2 can be worn around the viewer's head H.

Image Display Apparatus

The image display apparatus 1 includes the image generators 3, the expander optical systems 4, and the reflectors 6, as described above.

The components of the image display apparatus 1 according to the present embodiment will be described below in detail.

Image Generators

The image generators 3 are built in the temples 22 of the frame 2 described above, as shown in FIG. 2.

Each of the image generators 3 includes a video light generator 31, a drive signal generator 32, a controller 33, a lens 34, a light diffracting section 35, and a light sweeper 36, as shown in FIGS. 3 and 4.

The thus configured image generator 3 has a function of generating video light modulated based on a video signal and a function of generating a drive signal that drives the light sweeper 36.

The components of the image generator 3 will be described below in detail.

Video Light Generator

The video light generator 31 generates video light L1 to be scanned (optically scanned) by the optical sweeper 36 (optical scanner).

The video light generator 31 includes alight source section 311, which includes a plurality of light sources (light source sections) 311R, 311G, and 311B, each of which emits light of a wavelength different from the others, a plurality of drive circuits 312R, 312G, and 312B, and a light combiner (combiner) 313.

In the light source section 311, the light source 311R (light source R) emits red light, the light source 311G (light source G) emits green light, and the light source 311B emits blue light. Using the light beams of the three colors allows display of a full-color image.

Each of the light sources 311R, 311G, and 311B is not limited to a specific component and can, for example, be a laser diode, an LED, or any other component.

The light sources 311R, 311G, and 311B are electrically connected to the drive circuits 312R, 312G, and 312B, respectively.

The drive circuit 312R has a function of driving the light source 311R described above. The drive circuit 312G has a function of driving the light source 311G described above. The drive circuit 312B has a function of driving the light source 311B described above.

The three light beams (video light beams) (of three colors) emitted from the light sources 311R, 311G, and 311B driven by the drive circuits 312R, 312G, and 312B are incident on the light combiner 313.

The light combiner 313 combines the light beams from the plurality of light sources 311R, 311G, and 311B.

In the present embodiment, the light combiner 313 includes two dichroic mirrors 313a and 313b.

The dichroic mirror 313a has a function of transmitting the red light and reflecting the green light. The dichroic mirror 313b has a function of transmitting the red light and the green light and reflecting the blue light.

Using the thus configured dichroic mirrors 313a and 313b allows the light beams of the three colors or the red light, the green light, and the blue light from the light sources 311R, 311G, and 311B to be combined with one another to form the single video light L1.

In the present embodiment, the light source section 311 described above is so arranged that the red light, the green light, and the blue light from the light sources 311R, 311G, and 311B have the same optical path length.

The light combiner 313 does not necessarily have the configuration described above using the dichroic mirrors and may have a configuration formed, for example, of a prism, a light guide, or an optical fiber.

The thus configured video light generator 31, in which the light source section 311 generates video light beams of the three colors and the light combiner 313 combines the video light beams with one another, forms the single video light L1. The video light L1 generated by the video light generator 31 is then outputted toward the lens 34.

The video light generator 31 described above may be provided, for example, with a light detector (not shown) that detects the intensity and other parameters of the video light L1 generated based on the light beams from the light sources 311R, 311G, and 311B. Providing the light detector allows adjustment of the intensity of the video light L1 in accordance with a result of the detection.

Lens

The video light L1 generated by the video light generator 31 is incident on the lens 34.

The lens 34 has a function of controlling the angle of radiation of the video light L1. The lens 34 is, for example, a collimator lens. A collimator lens is a lens that adjusts (modulates) light into a parallelized light beam.

The video light L1 outputted from the video light generator 31 is parallelized by the lens 34 and transmitted to the light diffracting section 35.

Light Diffracting Section

The video light L1 parallelized by the lens 34 is incident on the light diffracting section (first diffractive optical element) 35.

The light diffracting section 35 includes a diffractive optical element that diffracts the video light L1. The diffractive optical element, which is a reflective diffractive element, not only reflects the video light L1 incident on the light diffracting section 35 but also constructively enhances the light in terms of intensity and outputs the enhanced light at a specific angle determined in accordance with the wavelength of the light. Diffracted light having relatively large intensity is thus produced at the specific angle of diffraction.

In the present embodiment, the light diffracting section 35 is formed of a first hologram element 351, which is one type of diffraction grating. The first hologram element 351 is a semitransparent film characterized in that it diffracts light that forms the video light L1 incident on the light diffracting section 35 and belongs to a specific wavelength region but transmits light within the other wavelength bands.

Using the thus configured first hologram element 351, which operates based on diffraction, allows the video light L1 within the specific wavelength band to be guided to the light sweeper 36.

A diffraction grating that forms the light diffracting section 35 may be any reflective diffraction grating and may, for example, be a surface-relief-type diffraction grating (blazed grating), in which grooves having a sawtooth shape when viewed in a cross section are formed, or a surface-relief-type hologram element (blazed holographic grating), which is a combination of a hologram element and a surface-relief-type diffraction grating, as well as the hologram element described above (holographic grating).

Among the candidates described above, in consideration of diffraction efficiency, the surface blazed hologram element is preferably used. The element can provide particularly high diffraction efficiency when the wavelength of diffracted light determined by the angle of the surfaces that form the grooves (blazed angle) (wavelength of light diffracted at highest efficiency), the wavelength of diffracted light determined by the interval between interference fringes of the hologram element, and the wavelength of the video light L1 are set to correspond to one another.

The video light L1 thus diffracted by the light diffracting section 35 is transmitted to the light sweeper 36. The function of the light diffracting section 35 will be described later in detail.

Drive Signal Generator

The drive signal generator 32 generates a drive signal that drives the light sweeper 36 (optical scanner).

The drive signal generator 32 includes a drive circuit 321, which generates a first drive signal used by the light sweeper 36 to perform primary sweeping (horizontal sweeping) in a first direction and a drive circuit 322, which generates a second drive signal used by the light sweeper 36 to perform secondary sweeping (vertical sweeping) in a second direction perpendicular to the first direction.

For example, the drive circuit 321 generates a first drive signal V1 (voltage for horizontal sweeping), which periodically changes at a cycle T1, as shown in FIG. 5A, and the drive circuit 322 generates a second drive signal V2 (voltage for vertical sweeping), which periodically changes at a cycle T2 different from the cycle T1, as shown in FIG. 5B.

The first drive signal and the second drive signal will be described later in detail in conjunction with the description of the light sweeper 36, which will be made later.

The thus configured drive signal generator 32 is electrically connected to the light sweeper 36 via a signal line that is not shown. The drive signals (first and second drive signals) generated by the drive signal generator 32 are thus inputted to the light sweeper 36.

Controller

The drives circuits 312R, 312G, and 312B in the video light generator 31 and the drive circuits 321 and 322 in the drive signal generator 32 described above are electrically connected to the controller 33. The controller 33 has a function of controlling drive operation of the drives circuits 312R, 312G, and 312B in the video light generator 31 and the drive circuits 321 and 322 in the drive signal generator 32.

On the basis of instructions from the controller 33, the video light generator 31 generates the video light L1 modulated in accordance with image information, and the drive signal generator 32 generates drive signals according to the image information.

Light Sweeper

The video light L1 outputted from the video light generator 31 is incident on the light sweeper 36 via the lens 34 and the light diffracting section 35.

The light sweeper 36 is an optical scanner that two-dimensionally sweeps the video light L1 from the video light generator 31. The light sweeper 36 sweeps the video light L1 to form swept light (video light) L2.

The light sweeper 36 includes a movable mirror 11, a pair of shafts 12a and 12b (first shafts), a frame 13, two pairs of shafts 14a, 14b, 14c, and 14d (second shafts), a support 15, a permanent magnet 16, and a coil 17, as shown in FIG. 6. In other words, the light sweeper 36 has what is called a gimbal structure.

The movable mirror 11 and the pair of shafts 12a and 12b form a first oscillation system that swings (makes reciprocating pivotal motion) around a Y1 axis (first axis). The movable mirror 11, the pair of shafts 12a and 12b, the frame 13, the two pairs of shafts 14a, 14b, 14c, and 14d, and the permanent magnet 16 form a second oscillation system that swings (makes reciprocating pivotal motion) around a X1 axis (second axis).

The light sweeper 36 further includes a signal superimposing section 18 (see FIG. 7), and the permanent magnet 16, the coil 17, the signal superimposing section 18, and the drive signal generator 32 form a driver that drives the first and second oscillation systems described above (that is, causes movable mirror 11 to swing around X1 and Y1 axes).

The components of the light sweeper 36 will be sequentially described below in detail.

The movable mirror 11 has a base 111 (movable portion), a spacer 112, and a light reflection plate 113 fixed to the base 111 via the spacer 112.

A light reflection portion 114, which has light reflectivity, is provided on the upper surface (one surface) of the light reflection plate 113.

In the present embodiment, the light reflection plate 113 has a circular shape in a plan view. The light reflection plate 113 does not necessarily have a circular shape in the plan view and may, for example, have an elliptical shape, a rectangular shape, or any other polygonal shape.

The thus shaped light reflection plate 113 has a hard layer 115 provided on the lower surface thereof (the other surface), as shown in FIG. 7.

The hard layer 115 is made of a material harder than the material of which the body of the light reflection plate 113 is made, whereby the rigidity of the light reflection plate 113 can be increased. The thus increased rigidity prevents the light reflection plate 113 from being bent or suppresses the amount of bending when the light reflection plate 113 swings. The increased rigidity also allows a decrease in the thickness of the light reflection plate 113, whereby the moment of inertia of the light reflection plate 113 around the X1 and Y1 axes can be reduced when the light reflection plate 113 swings therearound.

The material of which the hard layer 115 is made is not limited to a specific material and can be any material harder than the material of which the body of the light reflection plate 113 is made, for example, diamond, a carbon nitride film, quartz, sapphire, lithium tantalate, or potassium niobate.

The hard layer 115 may be formed of a single layer or a laminate including a plurality of layers. The hard layer 115 is provided as necessary and can be omitted.

The lower surface of the light reflection plate 113 is fixed to the base 111 via the spacer 112. The light reflection plate 113 can therefore swing around the Y1 axis without the light reflection plate 113 coming into contact with the shafts 12a, 12b, the frame 13, or the shafts 14a, 14b, 14c, 14d.

The frame 13, which has a frame-like shape, is so provided that it surrounds the base 111 of the movable mirror 11 described above, as shown in FIG. 6. In other words, the base 111 of the movable mirror 11 is provided inside the frame 13, which has a frame-like shape.

The frame 13 is supported by the support 15 via the shafts 14a, 14b, 14c, and 14d. The base 111 of the movable mirror 11 is supported by the frame 13 via the shafts 12a and 12b.

The shafts 12a and 12b join the movable mirror 11 to the frame 13 in such a way that the movable mirror 11 is pivotable (swingable) around the Y1 axis. Further, the shafts 14a, 14b, 14c, and 14d join the frame 13 to the support 15 in such a way that the frame 13 is pivotable (swingable) around the X1 axis, which is perpendicular to the Y1 axis.

The shafts 12a and 12b are disposed on opposite sides of the base 111 of the movable mirror 11. Further, each of the shafts 12a and 12b has an elongated shape extending in the direction along the Y1 axis. Each of the shafts 12a and 12b has one end connected to the base 111 and the other end connected to the frame 13. Each of the shafts 12a and 12b is further so disposed that the central axis thereof coincides with the Y1 axis.

The thus configured shafts 12a and 12b are torsionally deformed when the movable mirror 11 swings around the Y1 axis.

The shafts 14a and 14b and the shafts 14c and 14d are disposed on opposite sides of the frame 13 (so disposed that they sandwich the frame 13). Each of the shafts 14a, 14b, 14c, and 14d has an elongated shape extending in the direction along the X1 axis. Further, each of the shafts 14a, 14b, 14c, and 14d has one end connected to the frame 13 and the other end connected to the support 15. Further, the shafts 14a and 14b are disposed on opposite sides of the X1 axis. Similarly, the shafts 14c and 14d are disposed on opposite sides of the X1 axis.

The shafts 14a, 14b, 14c, and 14d are so configured that the shafts 14a and 14b as a whole and the shafts 14c and 14d as a whole are torsionally deformed when the frame 13 swings around the X1 axis.

As described above, the movable mirror 11 swingable around the Y1 axis and the frame 13 swingable around the X1 axis allow the movable mirror 11 to swing (make reciprocating pivotal motion) around the two axes perpendicular to each other, the X1 and Y1 axes.

Although not shown, at least one of the shafts 12a and 12b and at least one of the shafts 14a, 14b, 14c, and 14d are each provided with an angle detection sensor, such as a strain sensor. The angle detection sensor can detect information on the angle of the light sweeper 36, more specifically, angles of swing motion of the light reflection portion 114 around the X1 and Y1 axes. A result of the detection is inputted to the controller 33 via a cable that is not shown.

The permanent magnet 16 is bonded to the lower surface of the frame 13 described above (surface facing away from light reflection plate 113).

In the present embodiment, the permanent magnet 16 has an elongated shape (rod-like shape) and is disposed along a direction inclined to the X1 and Y1 axes. The permanent magnet 16 is magnetized in the elongated direction thereof. That is, the permanent magnet 16 is so magnetized that one end thereof forms an S pole and the other end thereof forms an N pole.

The present embodiment is described with reference to the case where one permanent magnet is disposed on the frame 13, but the number of permanent magnets is not limited one. For example, two permanent magnets may be disposed on the frame 13. In this case, for example, two elongated permanent magnets may be so disposed on the frame 13 that they face and are parallel to each other with the base 111 therebetween in the plan view.

The coil 17 is provided immediately below the permanent magnet 16. That is, the coil 17 is so provided that it faces the lower surface of the frame 13. A magnetic field produced by the coil 17 can therefore be exerted on the permanent magnet 16 in an efficient manner, whereby the movable mirror 11 is allowed to pivot around the two axes (X1 axis and Y1 axis) perpendicular to each other.

The coil 17 is electrically connected to the signal superimposing section 18 (see FIG. 7).

When the signal superimposing section 18 applies voltage to the coil 17, the coil 17 produces a magnetic field having a magnetic flux perpendicular to the X and Y axes.

The signal superimposing section 18 includes an adder (not shown) that superimposes the first drive signal V1 and the second drive signal V2 described above on each other and applies the superimposed voltage to the coil 17.

The drive circuit 321 generates the first drive signal V1 (voltage for horizontal sweeping), which periodically changes at the cycle T1, for example, as shown in FIG. 5A. That is, the drive circuit 321 generates the first drive signal V1 having a first frequency (1/T1).

The first drive signal V1 has a sinusoidal waveform. The light sweeper 36 can therefore effectively perform primary optical sweeping. The waveform of the first drive signal V1 is not limited to a sinusoidal waveform.

The first frequency (1/T1) is not limited to a specific value and may be any value suitable for the horizontal sweeping and preferably ranges from 10 to 40 kHz.

In the present embodiment, the first frequency is set to be equal to a torsional resonant frequency (f1) of the first oscillation system (torsional oscillation system) formed of the movable mirror 11 and the pair of shafts 12a and 12b. That is, the first oscillation system is so designed (manufactured) that the torsional resonant frequency f1 thereof has a value suitable for horizontal sweeping. The angle of pivotal motion of the movable mirror 11 around the Y1 axis can therefore be increased.

On the other hand, the drive circuit 322 generates the second drive signal V2 (voltage for vertical sweeping), which periodically changes at the cycle T2 different from the cycle T1 as described above, as shown in FIG. 5B. That is, the drive circuit 322 generates the second drive signal V2 having a second frequency (1/T2).

The second drive signal V2 has a sawtooth waveform. The light sweeper 36 can therefore effectively perform vertical (secondary) optical sweeping. The waveform of the second drive signal V2 is not limited to a sawtooth waveform.

In the present embodiment, the frequency of the second drive signal V2 is adjusted to a value different from the torsional resonant frequency (resonant frequency) of the second oscillation system (torsional oscillation system) formed of the movable mirror 11, the pair of shafts 12a and 12b, the frame 13, the two pairs of shafts 14a, 14b, 14c, and 14d, and the permanent magnet 16.

In a raster scan method, which is a video drawing method, the horizontal sweeping described above is performed and the vertical sweeping described above is performed at the same time. In this operation, the frequency of the horizontal sweeping is set to be higher than the frequency of the vertical sweeping. In general, in the thus configured raster scan method, the sweeping performed at the higher frequency is called primary sweeping, and the sweeping performed at the lower frequency is called secondary sweeping.

According to the light sweeper 36 described above, since the movable mirror 11 including the light reflection portion 114 is caused to swing around the two axes perpendicular to each other, the size and weight of the light sweeper 36 can be reduced. As a result, the image display apparatus 1 can be an apparatus that further excels in ease of use for a viewer.

In particular, since the light sweeper 36 has a gimbal mechanism, the configuration for two-dimensionally sweeping video light (light sweeper 36) can be more compact.

Expander Optical System

The swept light (video light) L2 having been swept by the light sweeper 36 described above is transmitted to the expander optical system 4, as shown in FIG. 3.

The expander optical system 4 has a function of expanding the light beam width of the video light L2 having been swept by the light sweeper 36, that is, expanding the cross-sectional area of the video light L2.

The expander optical system 4 may be any optical system that has the function described above, and the configuration of the expander optical system 4 is not limited to a specific configuration. The expander optical system 4 according to the present embodiment includes an optical element 5, a correction lens 42, and a light blocking plate 43, as shown in FIG. 3 by way of example. The image display apparatus 1 according to the present embodiment includes the thus configured expander optical system 4, which can, however, be omitted when the function described above is not required.

The components of the expander optical system 4 will be sequentially described below in detail.

Optical Element

The optical element 5 is provided in the vicinity of the light sweeper 36, has light transparency (translucency), and has an elongated shape along the Z-axis direction, as shown in FIG. 3.

The video light L2 swept by the light sweeper 36 described above is incident on the optical element 5.

The optical element 5 expands the light beam width (cross-sectional area) of the video light L2 swept by the light sweeper 36. Specifically, the optical element 5 causes the video light L2 having been swept by the light sweeper 36 to propagate in the Z direction while causing the video light L2 to undergo multiple reflection in the optical element 5 to expand the light beam width of the video light L2 and outputs video light L3, L4, the light beam width of which is greater than that of the video light L2. The thus configured optical element 5 functions as what is called a pupil expander optical system.

The optical element 5 has a light incident surface 56 and a light exiting surface 57 at opposite ends thereof in the length direction (Z-axis direction), and the two surfaces (light incident surface 56 and light exiting surface 57) face each other, as shown in FIGS. 8A to 8D. The optical element 5 further has side surfaces 58a and 58b, which face each other in the thickness direction thereof (X-axis direction), and side surfaces 59a and 59b, which face each other in the width direction thereof (Y-axis direction).

The light incident surface 56 is so provided that it faces the light sweeper 36, and the light exiting surface 57 is so provided that it faces the correction lens 42 and the light blocking plate 43 (see FIG. 3).

The light incident surface 56 is a surface which has light transparency and on which the video light L2 having been swept by the light sweeper 36 is incident. On the other hand, the light exiting surface 57 is a surface which has light transparency and through which the video light L2 having been incident through the light incident surface 56 exits as the video light L3 and L4.

Each of the side surfaces 58a and 58b is a total reflection surface and totally reflects the video light L2 having entered the optical element 5. The total reflection surface used herein is not limited to a surface having a light transmittance of 0% and includes a surface that slightly transmits light, for example, a surface having a light transmittance lower than 3%.

Each of the side surfaces 59a and 59b may be a surface having any light transmittance, for example, a total reflection surface and a semi-reflective surface and is, in particular, preferably a surface having relatively low light transmittance, which prevents the light in the optical element 5 from forming stray light. Another way to prevent the light in the optical element 5 from forming stray light may, for example, be roughening the side surfaces 59a and 59b.

The light incident surface 56 and the light exiting surface 57 are parallel to each other, so are the side surface 58a and the side surface 58b, and the side surface 59a and the side surface 59b, as shown in FIGS. 8A to 8D. Therefore, in the present embodiment, the optical element 5 has a box-like shape as a whole.

The term "parallel" described above is not limited to perfect parallelism and includes, for example, a situation in which the angle between the surfaces facing each other is about ±2°.

Further, the light incident surface 56 and the light exiting surface 57 are parallel to each other in the present embodiment, but the light incident surface 56 and the light exiting surface 57 are not necessarily parallel to each other and the absolute values of the inclination angles of the light incident surface 56 and the light exiting surface 57 only need to be equal to each other. The state in which "the absolute values of the inclination angles of the light incident surface 56 and the light exiting surface 57 are equal to each other" includes, for example, a state in which the light incident surface 56 is inclined to an XY plane in the +Z-axis direction by an acute angle α (+20°, for example) and the light exiting surface 57 is inclined to an XY plane in the −Z-axis direction by the acute angle α (−20°, for example).

Further, the side surface 59a and the side surface 59b are parallel to each other in the present embodiment, but the side surface 59a and the side surface 59b are not necessarily parallel to each other and may be inclined by different angles.

The thus configured optical element 5 has a light guide portion (first light guide portion) 51, a light guide portion (second light guide portion) 52, and a light guide portion (third light guide portion) 53, which guide the video light L2, and a half-silvered mirror layer (first light splitting layer) 54 and a half-silvered mirror layer (second light splitting layer) 55, as shown in FIGS. 8A to 8D.

In the optical element 5, the light guide portion 51, the half-silvered mirror layer 54, the light guide portion 52, the half-silvered mirror layer 55, and the light guide portion 53 are stacked on each other in this order along the thickness direction thereof (X-axis direction). That is, the optical element 5 is a one-dimensional array in which the light guide portions 51, 52, and 53 are arranged along the thickness direction thereof with the half-silvered mirror layers 54 and 55 interposed therebetween.

Each of the light guide portions 51, 52, and 53 is a plate-shaped light pipe and has a function of causing the video light L2 having been incident through the light incident surface 56 (video light having been swept by light sweeper 36) to propagate in the +Z direction.

Each of the light guide portions 51, 52, and 53 has an oblong cross-sectional shape (cross-sectional shape in XY plane), as shown in FIGS. 8C and 8D, but each of the light guide portions 51, 52, and 53 does not necessarily have the cross-sectional shape (cross-sectional shape in XY plane) described above and may have a square or any other rectangular cross-sectional shape or any other polygonal cross-sectional shape.

Further, the light guide portions 51, 52, and 53 only need to have light transparency and are made, for example, of an acrylic resin, a polycarbonate resin, or any of other variety of resin materials, or any of variety of glass materials.

Each of the half-silvered mirror layers 54 and 55 is formed, for example, of a reflection film having light transparency, that is, a semi-transparent reflection film. Each of the half-silvered mirror layers 54 and 55 has a function of reflecting part of the video light L2 and transmitting part thereof. Each of the half-silvered mirror layers 54 and 55 is formed, for example, of a semi-transparent reflection film, such as a metal reflection film made, for example, of silver (Ag) or aluminum (Al) and a dielectric multilayer film.

The thus configured optical element 5 can be produced, for example, by forming a thin film that can form the half-silvered mirror layer 54 or 55 on a principal surface of each of the light guide portions 51, 52, and 53 and bonding the resultant light guide portions 51, 52, and 53 to each other in a surface activation bonding process. Manufacturing the optical element 5 in a surface activation bonding process provides high parallelism between the portions that form the optical element 5 (light guide portions 51, 52, and 53).

The thus configured optical element 5 causes the video light L2 having been swept by the light sweeper 36 to be incident through the light incident surface 56, undergo multiple refection in the optical element 5, and exit through the light exiting surface 57 as the video light L3 and L4 having an expanded light beam width, as shown in FIG. 9. The optical element 5 can thus expand the light beam width (cross-sectional area) of the video light L2.

The light incident surface 56 and the light exiting surface 57 are preferably parallel to each other. In this case, the amount of refraction of the video light L2 that is incident on the light incident surface 56 can be equal to the amount of refraction of the video light L3 and the video light L4 that exit through the light exiting surface 57. That is, the angle θ5 at which the video light L2 is incident on the half-silvered mirror layers 54 and 55 can be equal to the angle θ5 at which the video light L3 and the video light L4 exit out of the half-silvered mirror layers 54 and 55. This prevents occurrence of distortion resulting from the trigonometric function in the law of refraction and chromatic aberrations resulting from wavelength dispersion in the refractive index of the material of the optical element 5.

The optical element 5 in the present embodiment is a one-dimensional array (first one-dimensional array) in which the light guide portions 51, 52, and 53 are arranged along the thickness direction. The relatively simple configuration in which the light guide portions 51, 52, and 53 are stacked on each other allows the video light L2 incident through the light incident surface 56 to undergo multiple reflection in the optical element 5. The relatively simple configuration in the present embodiment therefore allows expansion of the light beam width of the video light L2 without use of a position detector or any other component that aligns the video light with the viewer's lines of sight or the positions of the viewer's right and left eyes EY.

Further, in the state in which the head mounted display is worn around the viewer's head H, the optical element 5 is so disposed that the principal rays of the video light L3 and L4 exit out of the reflector 6 in an in-plane direction (in-XZ-plane direction) including an axial line W (see FIG. 1), which is parallel to the direction in which the viewer's right eye EY and the left eye EY are arranged side by side (X-axis direction), as shown in FIG. 3. In other words, the optical element 5 is so disposed that the cross-sectional area of the video light L3 is expanded in the direction of the axial line W. Further, the correction lens 42 and the light blocking plate 43 are arranged along the axial line W. Therefore, the video light L3 having exited through the light exiting surface 57 is directed toward the reflector 6 via the correction lens 42, and the video light L4 having exited through the light exiting surface 57 is directed toward the light blocking plate 43. As described above, disposing the optical element 5 in such a way that the cross-sectional area of the video light L3 is expanded in the direction of the axial line W allows the video light L3 guided to the viewer's eyes via the correction lens 42 and the reflector 6 to be expanded in the rightward/ leftward direction of the viewer's eyes. The visibility of the video light L3 can therefore be enhanced in the rightward/leftward direction, in which the viewer's eyes move over a wider range than in the upward/downward direction.

Correction Lens

The video light L3 having exited out of the optical element 5 is incident on the correction lens 42, as shown in FIG. 3.

The correction lens 42 has a function of correcting corruption of the parallelism of the video light L3 due to an aspheric surface mirror 61 of the reflector 6, which will be described above. The function allows improvement in resolution performance of the video light L3. The thus functioning correction lens 42 can, for example, be a troidal lens, a cylindrical lens, and a free curved surface lens.

Light Blocking Plate

The video light L4 having exited out of the optical element 5 is incident on the light blocking plate 43.

The light blocking plate 43 is made of a light absorbing material, which absorbs light, and serves as a light blocker, which blocks light. The light blocking plate 43 blocks the video light L4 having exited out of the optical element 5 as unnecessary light.

The thus functioning light blocking plate 43 is made, for example, of stainless steel or an aluminum alloy.

In the present embodiment, the light blocking plate 43 is used as the light blocker for blocking the video light L4, but the light blocker for blocking the video light L4 is not limited to the light blocking plate 43 and only needs to prevent the video light L4 from forming stray light. For example, as the light blocker, the light blocking plate 43 may not be used but the video light L4 may be blocked by using a configuration in which paint is applied to a periphery of the frame 2.

The video light L3 having a light beam width expanded by the thus configured expander optical system 4 is incident on the reflector 6 via the correction lens 42, as shown in FIG. 3.

Reflector

The reflector 6 is provided on the shade section 212 of the front section 21 and so disposed that the reflector 6 is located in front of the viewer's left eye EY when the head mounted display is used. The reflector 6 is large enough to cover the viewer's eye EY and has a function of causing the video light L3 from the optical element 5 to be directed to and incident on the viewer's eye EY.

The reflector 6 has an aspheric surface mirror 61, which includes a light diffracting section (second diffractive optical element) 65.

The aspheric surface mirror 61 is a translucent member formed of a substrate made, for example, of a resin material showing high light translucency (light transparency) in the visible region and a semi-transparent reflection film formed on the substrate. That is, the aspheric surface mirror is a half-silvered mirror also having a function of transmitting outside light (translucency for visible light). The reflector 6, which includes the aspheric surface mirror 61, therefore has a function of reflecting the video light L3 having exited out of the optical element 5 and transmitting outside light traveling from the region outside the reflector 6 toward the viewer's eye EY when the head mounted display is used. The viewer can thus visually recognize a virtual image (picture) formed by video light L5 while visually recognizing an outside image. That is, a see-through-type head mounted display can be achieved.

The thus functioning aspheric surface mirror 61 has a shape curved along the curvature of the front section 21 of the frame 2, and a concave surface 611 is located on the side facing the viewer when the head mounted display is used. The video light L5 reflected off the aspheric surface mirror 61 is thus allowed to efficiently converge toward the viewer's eye EY.

The light diffracting section 65 is provided on the concave surface 611. The light diffracting section 65, which operates based on diffraction, has a function of deflecting the video light L3 having exited through the light exiting surface 57 of the optical element 5 toward the viewer's eye EY. That is, the light diffracting section 65 includes a diffractive optical element that diffracts the video light L3. The diffractive optical element, which is a reflective diffractive element, not only reflects the video light L3 incident on the light diffracting section 65 but also constructively enhances the light in terms of intensity and outputs the enhance light at a specific angle determined by the wavelength of the light. Diffracted light having relatively large intensity is thus produced at the specific angle of diffraction.

The light diffracting section 65 is formed of a second hologram element 651, which is one type of diffracting grating, in the present embodiment. The second hologram element 651 is a semitransparent film characterized in that it diffracts light that forms the video light L3 incident from the optical element 5 on the second hologram element 651 and belongs to a specific wavelength band but transmits light within the other wavelength bands.

Using the thus configured second hologram element 651 allows adjustment of video light within a specific wavelength band, specifically, adjustment of the video light guided to the viewer's eye based on diffraction in terms of the angle and the state of the light beam, whereby a virtual image can be formed in a position in front of the eye. Specifically, the video light L3 reflected off the aspheric surface mirror 61 travels outward, and the second hologram element 651 causes the reflected light to be incident as the video light L5 on the viewer's left eye EY. The same holds true for the reflector 6 located on the side where the right eye EY is present. The video light L5 having been incident on each of the viewer's right and left eyes EY is focused on the viewer's retinae. The viewer can thus view a virtual image (picture) formed in a field of view of the viewer by the video light L3 having exited out of the optical element 5.

The diffraction grating that forms the light diffracting section 65 may be any reflective diffraction grating and may, for example, be a surface-relief-type diffraction grating (blazed grating), in which grooves having a sawtooth shape when viewed in a cross section are formed, or a surface-relief-type hologram element (blazed holographic grating), which is a combination of a hologram element and a surface-relief-type diffraction grating, as well as the hologram element described above (holographic grating).

According to the image display apparatus 1 described above, in which the expanding optical system 4 expands the video light L1 generated by the image generator 3 and the expanded video light is guided to the viewer's eye EY via the reflector 6, the viewer can recognize the video light generated by the image generator 3 in the form of a virtual image formed in the viewer's field of view.

Figure 10:
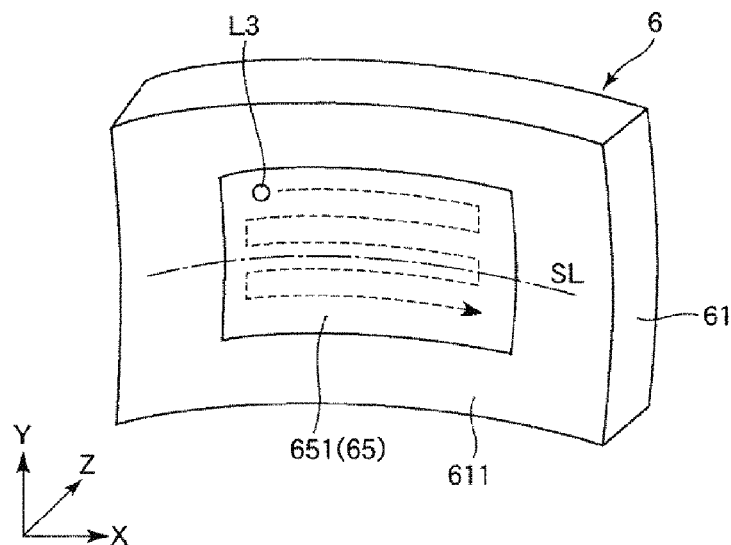
FIG. 10 shows an example in which video light swept by the light sweeper is projected on a reflector and two-dimensionally scans the reflector.

FIG. 10 shows an example in which the video light swept by the light sweeper 36 is projected on the reflector 6 and two-dimensionally scans the reflector 6.

In the example shown in FIG. 10, the video light L3 having been swept by the light sweeper 36 and expanded by the expander optical system 4 is projected on the second hologram element 651 (light diffracting section 65), which has an oblong shape, on the aspheric mirror 61 of the reflector 6.

A combination of the primary sweeping of the video light L3 in the horizontal direction (rightward/leftward direction in FIG. 10) and the secondary sweeping of the video light L3 in the vertical direction (upward/downward direction in FIG. 10) allows arbitrary video images to be drawn in the second hologram element 651. The video light L3 is not necessarily swept in a specific pattern. In an example of the pattern indicated by the broken-line arrow in FIG. 10, after the video light L3 undergoes the primary sweeping along the horizontal direction, undergoes the secondary sweeping at the end of the primary sweeping, undergoes tracing-back primary sweeping along the horizontal direction, and then undergoes secondary sweeping at the end of the primary sweeping, with the action described above repeated.

Figure 11:
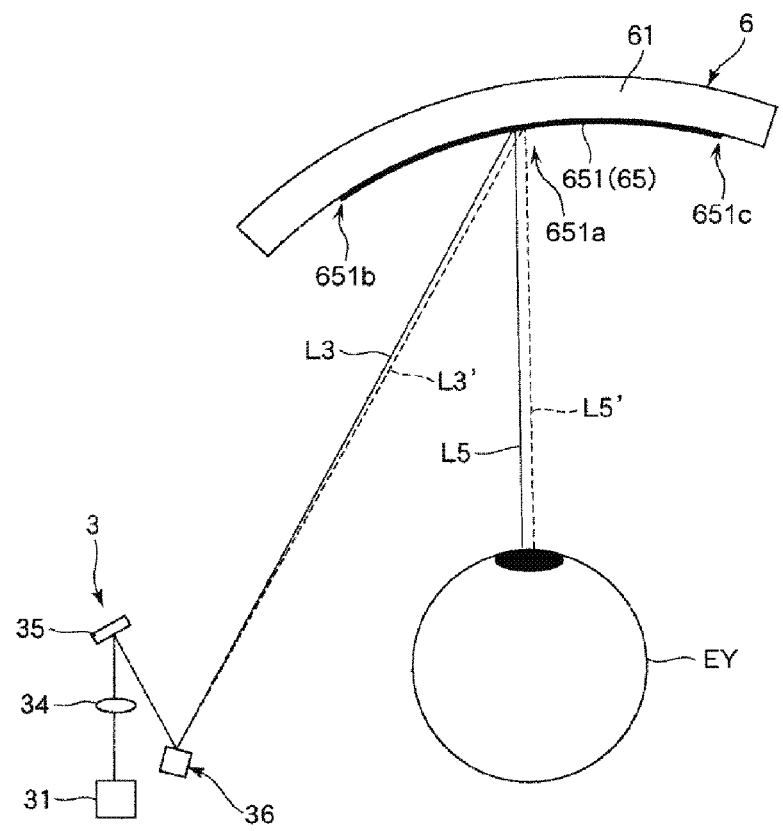
FIG. 11 describes an effect of the image display apparatus shown in FIG. 3.

FIG. 11 describes an effect of the image display apparatus shown in FIG. 3.

The angle of diffraction that occurs in the light diffracting section 65 depends on the wavelength of the video light L3 incident on the light diffracting section 65. Provided that the video light L3 is perfect monochromatic light, that is, the video light L3 contains only light of a specific wavelength, the angle of diffraction of the video light L3 is always fixed, and the video light L5 to be incident on the viewer's eye EY always exits in a fixed direction. The position of a virtual image recognized by the viewer therefore does not shift, whereby the viewer can visually recognize a clear image with no blur or smear.

It is, however, not easy to achieve a situation in which the video light L3 is perfect monochromatic light, in other words, a situation in which the video light L1 to be incident on the light diffracting section 35 is perfect monochromatic light, and the video light L1 tends to have a wavelength width, for example, of several nanometers although it depends on the type of the light source section 311. In particular, when each light source is formed of a longitudinal multimode semiconductor laser, the tendency is noticeable. In a configuration of related art including no light diffracting section 35, the video light L1 having such a wavelength width is incident on and diffracted by the light diffracting section 65, and the angle of diffraction of the video light has a predetermined angle width according to the wavelength width, which is, for example, several nanometers. As a result, the video light L5 has the angle width, and the imperfect video light L5 is incident on the viewer's eye EY. A positional shift of video light focused on the viewer's retina is more greatly affected by an angular shift of the video light incident on the viewer's eye EY than a positional shift of the video light incident on the viewer's eye EY, resulting in a large positional shift ranging from a value corresponding to several pixels to a value corresponding to several tens of pixels in the configuration of related art.

Now, calculate the positional shift and show a result of the calculation below. When the light incident on the light diffracting section 65 is green light and when the wavelength of the green light shifts by 1 nm (when wavelength has width), a positional shift corresponding to 3.4 pixels occurs on the retina. When the light incident on the light diffracting section 65 is blue light and when the wavelength of the blue light shifts by 1 nm, a positional shift corresponding to 3.9 pixels occurs on the retina, and when the light incident on the light diffracting section 65 is red light and when the wavelength of the red light shifts by 1 nm, a positional shift corresponding to 2.7 pixels occurs. Such a positional shift of a virtual image lowers the resolution of video images recognized by the viewer. In other words, the quality of the video images lowers.

When the temperature of the light source section 311 changes as the environmental temperature changes, the wavelength of the outputted light changes in accordance with the temperature characteristic of the light source section 311. When the wavelength of the video light L3 thus changes, the angle of diffraction that occurs in the light diffracting section 65 changes, resulting in a change in the position where the video light L5 is focused. When the light source 311R, which emits red light, the light source 311G, which emits green light, and the light source 311B, which emits blue light, have the same temperature characteristic, the amounts of shift of the positions where the light beams of the three colors are focused are the same, whereby no color shift occurs although video images move (shift).

The light sources 311R, 311G, and 311B, however, typically have temperature characteristics different from one another. In this case, when the environmental temperature changes, the width of a change in wavelength varies among the colors of the three light beams. As a result, in the configuration of related art, for example, red video light L5, green video light L5, and blue video light L5 are focused in positions different from one another, resulting not only in a shift of video images but also in what is called color shift.

Further, when the output from each of the light sources 311R, 311G, and 311B is changed to modulate the intensity of the video light L5 (direct modulation), the wavelength of the outputted light changes in some cases with the change in drive current. In a case where such a change in wavelength occurs, the wavelength of the video light L3 changes based on an intensity modulation signal, and the angle of diffraction that occurs in the light diffracting section 65 also changes with time based on the intensity modulation signal. As a result, in the configuration of related art, whenever the intensity of the video light L5 is modulated, the position where the video light L5 is focused shifts, resulting in a decrease in the resolution of video images visually recognized by the viewer.

To solve the problems described above, in the present embodiment, the light diffracting section 35 is provided on the optical path between the lens 34 and the light sweeper 36. When light is incident on the light diffracting section 35, the angle of diffraction is accompanied by an angle width based on the wavelength width of the incident light (video light L1), as in the light diffracting section 65. For example, when the video light L1 has a wavelength width of several nanometers, the angle of diffraction of the light that exits out of the light diffracting section 35 is accompanied by a predetermined angle width corresponding to the wavelength width because the angle of diffraction is determined based on the shape of the first hologram element 351, which forms the light diffracting section 35, and the wavelength of the video light L1. In the example shown in FIG. 11, the light diffracting section 35 diffracts the video light L1, and the video light L3 and video light L3', which propagate while spreading at a predetermined angle. In the following description, the diffraction of the video light L1 that occurs in the light diffracting section 35 is called "first diffraction" for ease of description.

The video light L1 incident on the light diffracting section 35, which is the light before it is swept by the light sweeper 36, spatially spreads only by a small amount. The area of the light diffracting section 35 necessary to diffract the light therefore only needs to be large enough to receive the video light L1, which spatially spreads by a small amount. Therefore, providing the light diffracting section 35 on the optical path between the lens 34 and the light sweeper 36 allows reduction in the size of the light diffracting section 35 and hence of the size of the image display apparatus 1.

The video light L3 and the video light L3', each of which is accompanied by a predetermined angle width produced by the first diffraction, are incident on the reflector 6 via the light sweeper 36 and the expander optical system 4. The video light L3 and the video light L3' incident on the light diffracting section 65 provided in the reflector 6 are diffracted again, as described above. In the following description, the diffraction of the video light L3 and the video light L3' that occurs in the light diffracting section 65 is called "second diffraction" for ease of description.

In the second diffraction as well, the angle of diffraction of the light that exits out of the light diffracting section 65 is accompanied by the predetermined angle width corresponding to the wavelength width because the angle of diffraction is determined based on the shape of the second hologram element 651, which forms the light diffracting section 65, and the wavelength of the video light L3 and the video light L3'.

The second diffraction occurs in such a way that the angle width of the angle of diffraction produced in the first diffraction is canceled (corrected). As a result, the angle width of the angle of diffraction of the video light L3 and the video light L3' having exited out of the light diffracting section 65 is suppressed to a small value, whereby the discrepancy between the positions where the video light L5 and the video light L5' are focused on the viewer's retina can be suppressed to a small value. That is, if no second diffraction is allowed to occur, the video light L3 and the video light L3' keep spreading at the predetermined angle and are incident on the eye with the angular difference unchanged, resulting in a decrease in the resolution on the retina. The second diffraction, however, cancels at least part of the angle width produced in the first diffraction, whereby the angular difference between the video light L5, which is the diffracted video light L3, and the video light L5', which is the diffracted video light L3', is reduced to a sufficiently small value, as shown in FIG. 11, and the difference in the focus position on the viewer's retina is also reduced to a sufficiently small value. As a result, a decrease in the resolution of video images can be suppressed.

Similarly, even when the wavelength of the light outputted from the light source section 311 changes as the environmental temperature changes, causing diffraction to occur twice allows an angular change in the angle of diffraction produced in the first diffraction to be at least partially canceled in the second diffraction. As a result, an angular change in the angle of diffraction in the second diffraction can be suppressed to a small value, whereby occurrence of color shift can be suppressed to a small degree.

Similarly, even when the light sources 311R, 311G, and 311B are directly modulated, causing diffraction to occur twice allows an angular change in the angle of diffraction produced in the first diffraction to be at least partially canceled in the second diffraction. As a result, an angular change in the angle of diffraction in the second diffraction can be suppressed to a small value, whereby a shift of the position where the video light L5 is focused on the viewer's retina can be suppressed to a small degree.

As described above, according to the present embodiment, even when the video light L1 is accompanied by a wavelength width, the width of a change in the wavelength varies depending on the color of light, or the wavelength changes with time, the video light L5 is so processed that an increase in the angular width of the angle of diffraction due to a wavelength width is suppressed and an increase in the width of a change in the angle of diffraction with time or for each color due to a change in the wavelength are suppressed. Therefore, the video light L5 is focused, for example, with a positional error of one pixel or smaller for suppression of a decrease in the image quality, and a decrease in the image quality due to color shift is also suppressed.

To cancel an angle width by which the angle of diffraction is accompanied as reliably as possible in the first and second diffraction, the grating cycle of the diffraction grating used in the first diffraction only needs to be as close as possible to the grating cycle of the diffraction grating used in the second diffraction.

In the present embodiment, the first hologram element 351 is used as the light diffracting section 35, which is responsible for the first diffraction, and the second hologram element 651 is used as the light diffracting section 65, which is responsible for the second diffraction. Since a hologram element diffracts light based on interference fringes recorded as a diffraction grating in the hologram element, the spatial interval between the interference fringes (diffraction grating cycle) of the first hologram element 351 only needs to be as close as possible to the spatial interval between the interference fringes of the second hologram element 651. In a case where a surface-relief-type diffraction grating is used in the first diffraction and the second hologram element 651 is used in the second diffraction, the interval between interference fringes of the surface-relief-type diffraction grating only needs to be as close as possible to the interval between interference fringes of the second hologram element 651. In the following sections, the description will be primarily made with reference to interference fringes, and the rules on interference fringes are directly applicable to a grating, grooves, and other diffraction grating structures. The diffraction grating cycle is applicable to the spatial interval between the lines of the hologram element.

The first hologram element 351 may have portions where interference fringes are arranged at intervals different from each other, but the entire interference fringes in the first hologram element 351 are preferably arranged at fixed intervals. The thus configured first hologram element 351 is readily designed and manufactured, whereby the interference fringes are likely to be arranged with high precision, which is advantageous, and cost reduction is achieved.

As for the rule of "fixed interval between interference fringes" in this case, fluctuation of the interval between the interference fringes and other types of variation resulting, for example, from a manufacturing process are accepted.

The interval between the interference fringes (diffraction grating cycle) of the first hologram element 351 is an interval determined on a line so drawn that the line passes through the point on the first hologram element 351 where the video light L1 is projected and the line crosses the interference fringes at right angles.

On the other hand, the second hologram element 651 preferably has portions where interference fringes are arranged at intervals different from each other. Specifically, in the second hologram element 651 shown in FIG. 11, for example, a central portion 651a, an end portion 651b on the side facing the image generator 3, and an end portion 651c on the side facing away from the image generator 3 need to diffract the video light L3 at angles different from one another so that the diffracted video light from each of the three portions is incident on the viewer's eye EY, and it is therefore preferable that the intervals between the interference fringes in the three portions are set to differ from one another in accordance with the angles of diffraction different from one another. The thus set intervals between the interference fringes allow the video light L3 having been two-dimensionally swept and projected on the second hologram element 651 to be so diffracted that the entire diffracted video light is incident on the viewer's eye EY. As a result, the viewer is allowed to visually recognize video images having a large angle of view and high image quality.

An example in which the second hologram element 651 has portions where interference fringes are arranged at intervals different from each other may include a case where the interference fringes are more sparse in the end portion 651b than in the central portion 651a and the interference fringes are more dense in the end portion 651c than in the central portion 651a. The thus configured interference fringes can provide the effect described above. Further, to set the intervals between the interference fringes to partially differ from each other, the intervals between the interference fringes are preferably configured to change continuously. This configuration can suppress a decrease in the resolution and other disadvantageous effects that occur when the intervals between the interference fringes change discontinuously.

Providing the second hologram element 651 with portions where interference fringes are arranged at intervals different from each other, however, could undesirably produces portions that greatly differ from the first hologram element 351 in terms of interval between interference fringes. When the portions greatly differ from the first hologram element 351 in terms of interval between interference fringes, an angle width of and an angular change in the angle of diffraction produced in the first diffraction could not undesirably be sufficiently canceled in the second diffraction as described above.

In consideration of these issues described above, the interval between the interference fringes of the first hologram element 351 is preferably set to be twice or smaller than the maximum of the intervals between the interference fringes of the second hologram element 651 but one-half or bigger than the minimum thereof. The thus set interval between the interference fringes allows suppression of the decrease in the resolution and the occurrence of color shift as compared with a case where no first hologram element 351 is provided, although it cannot be said that the function of allowing the second diffraction to cancel an angle width of and an angular change in the angle of diffraction produced in the first diffraction is sufficiently provided.

More preferably, the interval between the interference fringes of the first hologram element 351 is set at an intermediate value between the maximum and the minimum of the intervals between the interference fringes of the second hologram element 651. The setting allows, even when the second hologram element 651 have portions where interference fringes are arranged at intervals different from each other, the difference in the interval between the interference fringes between the first hologram element 351 and the second hologram element 651 to be sufficiently small roughly over the entire region of the second hologram element 651. An angle width of and an angular change in the angle of diffraction produced in the first diffraction can therefore be sufficiently canceled roughly over the entire region of the second hologram element 651.

On the other hand, the interval between the interference fringes of the first hologram element 351 is preferably set to be equal to the interval between the interference fringes in the central portion 651a of the second hologram element 651. The setting allows more sufficient cancellation of an angle width of and an angular change in the angle of diffraction produced in the first diffraction roughly over the entire region of the second hologram element 651, for example, in a case where the interval between the interference fringes of the second hologram element 651 is distributed within a fixed width with the interval between the interference fringes in the central portion 651a being a central value.

In addition, in the second hologram element 651 having the thus set intervals between the interference fringes, an angle width of and an angular change in the angle of diffraction tend to be most satisfactorily canceled in the central portion 651a, and the video light L5 diffracted by and reflected off the central portion 651a shows the most suppressed decrease in the resolution and color shift. The video light L5 diffracted by and reflected off the central portion 651a, in general, is believed in many cases to have information of relatively high importance among pieces of information in video images and to be light that tends to be visually recognized unconsciously with the viewer's eye EY. The video light L5 diffracted by and reflected off the central portion 651a, in which a decrease in the resolution and color shift is sufficiently suppressed, therefore allow the viewer to visually recognize video images having particularly high quality.

The interval between the interference fringes (diffraction grating cycle) of the second hologram element 651 is a value determined in the range over which the video light L3 is swept (corresponding in the present embodiment to the range over which the video light L3 is swept in the second hologram element 651) and on a sweep line SL of the primary sweeping that passes the center of the amplitude of the secondary sweeping along the vertical direction (upward/downward direction in FIG. 10) and extends along the horizontal direction (rightward/leftward direction in FIG. 10).

The central portion 651a of the second hologram element 651 refers to a position in the range over which the video light L3 is swept (corresponding in the present embodiment to the range over which the video light L3 is swept in the second hologram element 651) and also a position that is not only the center of the amplitude of the secondary sweeping along the vertical direction but also the center of the amplitude of the primary sweeping along the horizontal direction.

On the other hand, the interval between the interference fringes of the first hologram element 351 may be set to be equal to the average of the intervals between the interference fringes of the second hologram element 651. The setting allows, even when the second hologram element 651 have portions where interference fringes are arranged at intervals different from each other, the difference in the interval between the interference fringes between the first hologram element 351 and the second hologram element 651 to be sufficiently small roughly over the entire region of the second hologram element 651. An angle width of and an angular change in the angle of diffraction produced in the first diffraction can therefore be sufficiently canceled roughly over the entire region of the second hologram element 651.

As described above, the interval between the interference fringes of the first hologram element 351 is specified based on the comparison with the intervals between the interference fringes of the second hologram element 651 in terms of magnitude of the interval. Conversely, the intervals between the interference fringes of the second hologram element 651 may instead be specified based on the interval between the interference fringes of the first hologram element 351.

For example, the intervals between the interference fringes of the second hologram element 651 are preferably set to be greater than or equal to 70% but smaller than or equal to 130% of the interval between the interference fringes of the first hologram element 351, more preferably greater than or equal to 90% but smaller than or equal to 110% thereof. When the intervals between the interference fringes of the second hologram element 651 are so set that they falls within any of the ranges described above, the intervals between the interference fringes of the second hologram element 651 fall within a relatively narrow range having a central value equal to the interval between the interference fringes in the central portion 651a. An angle width of and an angular change in the angle of diffraction produced in the first diffraction can therefore be canceled with particular sufficiency roughly over the entire region of the second hologram element 651.

As a specific example, in a case where green light having a wavelength of 515 nm is diffracted, and when the interference fringes of the first hologram element 351 are formed at a density of 1550 per millimeter, the interference fringes in the central portion 651a of the second hologram element 651 are preferably formed at the density of 1550 per millimeter, and the interference fringes in the end portions 651b and 651c of the second hologram element 651 are preferably formed at a density greater than or equal to 1085 per millimeter but smaller than or equal to 2015 per millimeter, more preferably greater than or equal to 1395 per millimeter but smaller than or equal to 1705 per millimeter.

Further, in this case, the interference fringes in the end portions 651b and 651c of the second hologram element 651 are still more preferably formed at a density greater than or equal to 1490 per millimeter but smaller than or equal to 1700 per millimeter.

On the other hand, in a case where blue light having a wavelength of 450 nm is diffracted, the interference fringes of the first hologram element 351 are preferably formed at a density of 1790 per millimeter, and the densities of the interference fringes of the second hologram element 651 may be determined accordingly as described above.

Further, in a case where red light having a wavelength of 630 nm is diffracted, the interference fringes of the first hologram element 351 are preferably formed at a density of 1270 per millimeter, and the densities of the interference fringes of the second hologram element 651 may be determined accordingly as described above.

The calculation examples described above are obtained under conditions that video light is so swept that a virtual image having a rightward/leftward angle of view of ±15 degrees and a size corresponding to what is called 60 inches is visually recognized in a position in front of the viewer by 2.5 m. Further, in the calculation examples, the resolution of video images is set at 720 P, and the aspect ratio of the video images is set at 16:9.

In the image display apparatus according to the embodiment of the invention, the resolution is not limited to a specific value and may, for example, be 1080 P or 2160 P. Further, the aspect ratio is also not limited to a specific value and may, for example, be 4:3 or 2.35:1.

As described above, even when the first hologram element 351 and the second hologram element 651 differ from each other to some extent in terms of interval between the interference fringes, setting the difference within any of the ranges described above allows an angle width of and an angular change in the angle of diffraction produced in the first diffraction to be sufficiently canceled in the second diffraction, whereby an adverse effect of the difference on video images can be minimized. In other words, when the difference in the interval between the interference fringes between the first hologram element 351 and the second hologram element 651 falls within any of the ranges described above, and even when an angle width of and an angular change in the angle of diffraction are produced in the first diffraction, adverse effects of the angle width and the angular change on video images can be suppressed to a degree small enough for the viewer to recognize them by allowing the video images to undergo the second diffraction.

In the determination of the intervals between the interference fringes of the second hologram element 651, however, there is a prerequisite of causing the video light L3 to be so diffracted that the diffracted video light is incident on the viewer's eye EY, and the prerequisite makes it difficult in some cases to not only reliably cause the video light L5 to be incident on the viewer's eye EY but also maintain the above-mentioned effect of suppressing a decrease in the resolution and color shift at the same time, depending on the size of the second hologram element 651, the distance between the second hologram element 651 and the viewer, the positional relationship between the second hologram element 651 and the image generator 3, and other factors.

Also in consideration of such a case, the reflector 6 according to the present embodiment is so configured that the concave surface 611 is the surface facing the viewer. That is, the light incident surface of the second hologram element 651 on which the video light L3 is incident is a concave surface. The light incident surface of the second hologram element 651 on which the video light L3 is incident only needs to be concave at least in the direction perpendicular to the diffraction grating of the second hologram element 651 (that is, the direction perpendicular to the direction in which the grating pattern of the diffraction grating extends). When the second hologram element 651 is provided on the concave surface 611, the concave surface 611 acts to enhance the function of the second hologram element 651, in which an angle width of the angle of diffraction produced in the first diffraction is at least partially canceled in the second diffraction. That is, the second hologram element 651 causes the video light L5 generated by the diffraction that occurs in the second hologram element 651 to converge toward the viewer's eye EY as described above, but there is a background in which it is difficult in the design of the second hologram element 651 to arbitrarily select the angle of diffraction due to the restriction on the interval between the interference fringes described above, specifically, the restriction on the difference in the interval between the interference fringes limited to a value that is not very large in the second hologram element 651.

In view of the background described above, in the present embodiment, using the reflector 6 having the concave surface 611 and providing the second hologram element 651 on the concave surface 611 allow the concave surface 611 to have a function equivalent to a converging lens, which means that the function of causing the video light L5 to converge toward the eye EY is enhanced. As a result, the viewer is allowed to visually recognize video images having a large angle of view and high image quality. Further, the difference in the interval between the interference fringes is not required to be very large in the second hologram element 651 in accordance with the enhancement of the converging function. That is, even if an angle width of and an angular change in the angle of diffraction produced in the first diffraction are too large for the second hologram element 651 to sufficiently cancel, the concave surface 611 can compensate for part of the insufficient cancellation.

The reflector 6 may have a flat-plate shape having a flat surface but preferably has the concave surface 611 as in the present embodiment from the reason described above. The thus configured reflector 6 can reliably suppress a decrease in the resolution and color shift of video images due to an angle width of and an angular change in the angle of diffraction.

A description will now be made of a calculation example of comparison between the case where the reflector 6 has the concave surface 611 and the case where the reflector 6 has a flat surface in place of the concave surface 611 by way of example in terms of the diffraction grating conditions required to correct positional shift and color shift of the video light L5 focused on the viewer's retina.

In the case where the concave surface 611 is replaced with a flat surface, and when the interference fringes provided in a central portion of the flat surface of the reflector 6 are formed at the density of 1550 per millimeter, the calculation shows that the formation density over the entire flat surface needs to have a width having a minimum of 980 per millimeter and a maximum of 2200 per millimeter. That is, the maximum difference in the formation density over the flat surface is as large as 1220 per millimeter.

On the other hand, in the present embodiment, when the interference fringes provided in the central portion of the concave surface 611 of the reflector 6 are formed at the density of 1550 per millimeter, the calculation shows that the formation density over the entire concave surface 611 needs to have a width having a minimum of 1490 per millimeter and a maximum of 1700 per millimeter. That is, the maximum difference in the formation density over the concave surface 611 is suppressed to 210 per millimeter.

The calculation examples support the contention that providing the reflector 6 with the concave surface 611 suppresses the difference in the interval between the interference fringes formed in the reflector 6 to a small value. Suppressing the difference in the interval between the interference fringes formed in the reflector 6 as described above allows an increase in image quality not only in a central portion of video images but also over the entire video images.

The concave surface 611 does not necessarily have a specific shape and may, for example, have a free curved surface (aspheric) shape, a spherical shape, a hyperboloidal shape, or a parabolic shape.

The direction in which the interference fringes of the first hologram element 351 extend is preferably parallel to the direction in which the interference fringes of the second hologram element 651 extend. Specifically, in the case shown in FIG. 3, the direction in which the interference fringes of the first hologram element 351 extend and the direction in which the interference fringes of the second hologram element 651 extend are preferably perpendicular to the plane of view. The relationship of the direction of the incident light to the direction of diffraction (direction in which diffracted light exits) in the first diffraction is therefore the same as the relationship of the direction of the incident light to the direction of diffraction (direction in which diffracted light exits) in the second diffraction. An angle width of and an angular change in the angle of diffraction produced in the first diffraction can therefore be more reliably canceled in the second diffraction.

From a viewpoint of at least providing the advantageous effect described above, the direction in which the interference fringes of the first hologram element 351 extend is not necessarily parallel to the direction in which the interference fringes of the second hologram element 651 extend. For example, the state in which the direction in which the interference fringes of the first hologram element 351 extend is parallel to the direction in which the interference fringes of the second hologram element 651 extend can be changed, with the advantageous effect described above provided, to a state in which the second hologram element 651 is caused to pivot by an arbitrary pivotal angle around a pivotal axis perpendicular to the extending direction described above, for example, a state in which the second hologram element 651 is caused to pivot around a horizontal axis as the pivotal axis (what is called a "tilted" state).

Further, the direction in which the interference fringes (diffraction grating) of the second hologram element 651 extend is preferably perpendicular to the direction of the primary sweeping of the video light L3, that is, the horizontal direction. As described above, since an angle width of the angle of diffraction produced in the first diffraction is an angle width that spreads in the direction of the primary sweeping of the video light L3, the interference fringes of the second hologram element 651 need to be so arranged that the angle width is canceled in the second diffraction. Aligning the direction in which the interference fringes of the second hologram element 651 extend with the direction perpendicular to the direction of the primary sweeping of the video light L3 therefore allows an angle width of the angle of diffraction produced in the first diffraction to be more reliably canceled in the second diffraction.

In the image display apparatus 1 according to the present embodiment, light beams of the three colors of the red light, the green light, and the blue light are used to form video images, as described above. To this end, interference fringes for the red light, interference fringes for the green light, and interference fringes for the blue light are formed in the first hologram element 351 and the second hologram element 651 with the three types of interference fringes superimposed on (multiplexed with) each other. The thus configured first hologram element 351 and the second hologram element 651 can diffract and reflect the red light, the green light, and the blue light at individually optimum angles. As a result, full-color video images can be provided for each of the video light L5 formed of the red light, the video light L5 formed of the green light, and the video light L5 formed of the blue light with occurrence of an angle width of and an angular change in the angle of diffraction suppressed and hence a decrease in the resolution and color shift suppressed.

The relationship between the first hologram element 351 and the second hologram element 651 in terms of magnitude of the interval between the interference fringes and the relationship among the portions of the second hologram element 651 in terms of the magnitude of the interval between the interference fringes are therefore satisfied individually and independently for the interference fringes for the red light, the interference fringes for the green light, and the interference fringes for the blue light. An angle width of and an angular change in the angle of diffraction produced in the first diffraction, for example, for the red light are therefore at least partially canceled in the second diffraction. Similarly, an angle width of and an angular change in the angle of diffraction produced in the first diffraction for the green light are at least partially canceled in the second diffraction, and an angle width of and an angular change in the angle of diffraction produced in the first diffraction for the blue light are at least partially canceled in the second diffraction.

To manufacture the first hologram element 351 and the second hologram element 651 described above, for example, a proximity exposure method, a one-beam interference method, a two-beam interference method, a collinear method, and a variety of other manufacturing methods are used.

To superimpose interference fringes suitable for a plurality of types of light having different wavelengths, such as those described above, a hologram element substrate to be processed in any of the manufacturing methods described above may be exposed to the plurality of types of light having different wavelengths.

In a hologram element manufactured by using light of a specific wavelength, when light of the specific wavelength is incident on the hologram, particularly high diffraction efficiency is provided, but diffraction hardly occurs when light of any of the other wavelengths is incident on the hologram (high wavelength selectivity). Therefore, even when interference fringes for a plurality of types of light having different wavelengths are superimposed on each other on a single hologram layer, the independence of the interference fringes for each of the plurality of types of light is likely to be maintained, whereby occurrence of an angle width of and an angular change in the angle of diffraction can be suppressed for each of the red light, the green light, and the blue light.

In the image display apparatus 1, in addition to the red light, the green light, and the blue light, light of another color may be added. Conversely, the number of colors to be used may be smaller than three, that is, light of only one type of color or light of only two types of color may be used.

In the present embodiment, the light diffracting section 35 is provided between the video light generator 31 and the light sweeper 36. The video light L1 outputted from the video light generator 31 is therefore projected in a specific position in the light diffracting section 35 irrespective of the content of the video images. In other words, since the light diffracting section 35 is disposed in a light-source-side position upstream of the light sweeper 36, the video light L1 before it is spatially swept is projected on the light diffracting section 35, whereby the light diffracting section 35 requires a very small area. Therefore, according to the present embodiment, a small-area light diffracting section 35 can be used, whereby reduction in the size and cost of the image display apparatus 1 is achieved.

When the light diffracting section 35 is formed of a surface-relief-type diffraction grating or a surface-relief-type hologram element, inclined surfaces of the grooves in the surface relief specularly reflect light. It is therefore preferable to set the shape of the grooves in the surface relief as appropriate in such a way that the light diffracted in a predetermined direction based on the shape of the grooves in the surface relief travels toward the light sweeper 36.

Second Embodiment

An image display apparatus according to a second embodiment of the invention will next be described.

Figure 12A:
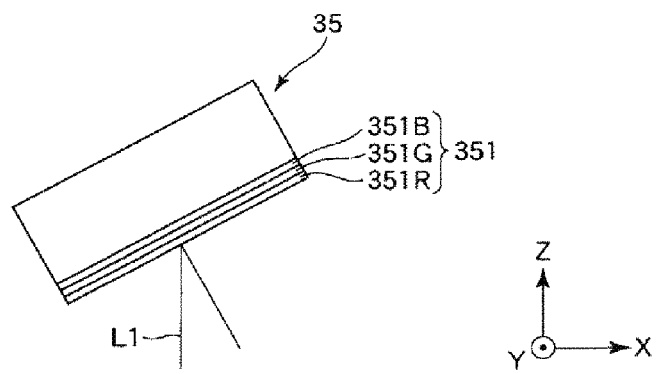
FIGS. 12A and 12B diagrammatically show the configuration of an image display apparatus according to a second embodiment of the invention.
Figure 12B:
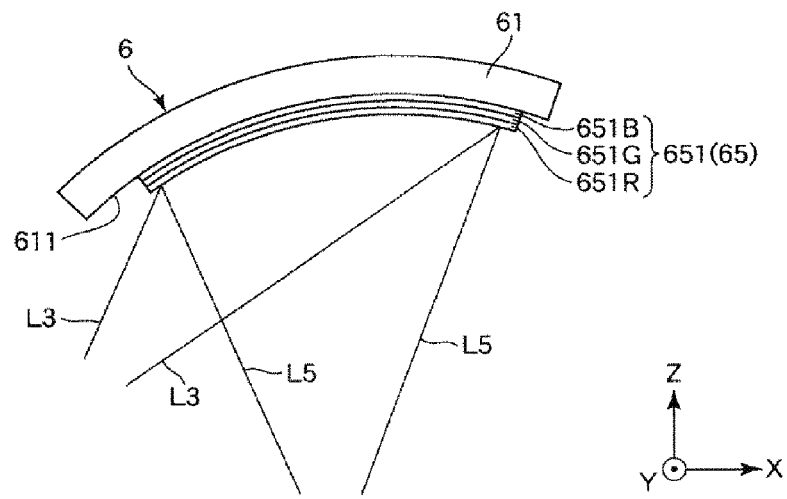

FIGS. 12A and 12B diagrammatically show the configuration of the image display apparatus according to the second embodiment of the invention.

The second embodiment will be described below. In the following description, items different from those in the first embodiment described above will be primarily described and the same items as those in the first embodiment will not be described. Further, in FIGS. 12A and 12B, the same items as those in the embodiment described above have the same reference characters.

An image display apparatus 1 according to the second embodiment only differs from the image display apparatus 1 according to the first embodiment in terms of the configuration of each of the first hologram element 351 and the second hologram element 651.

That is, each of the first hologram element 351 and the second hologram element 651 according to the first embodiment described above has interference fringes for the red light, interference fringes for the green light, and interference fringes for the blue light formed therein with the three types of interference fringes superimposed on (multiplexed with) each other at intervals different from each other in such a way that the interference fringes diffract the light of the three colors or the red light, the green light, and the blue light independently.

In contrast, the first hologram element 351 according to the present embodiment is formed of a stacked body of a hologram layer 351R for diffracting the red light, a hologram layer 351G for diffracting the green light, and a hologram layer 351B for diffracting the blue light, which are stacked on each other, as shown in FIGS. 12A and 12B.

Similarly, the second hologram element 651 according to the present embodiment is formed of a stacked body of a hologram layer 651R for diffracting the red light, a hologram layer 651G for diffracting the green light, and a hologram layer 651B for diffracting the blue light, which are stacked on each other, as shown in FIGS. 12A and 12B.

As described above, in the present embodiment, since interference fringes for the red light, interference fringes for the green light, and interference fringes for the blue light are formed in the hologram layers different from one another, a decrease in diffraction efficiency due to the superposition of interference fringes on each other in the same layer can be suppressed. Therefore, according to the present embodiment, the diffraction efficiency of each of the first hologram element 351 and the second hologram element 651 can be increased.

The relationship between the first hologram element 351 and the second hologram element 651 in terms of magnitude of the interval between the interference fringes and the relationship among the portions of the second hologram element 651 in terms of magnitude of the interval between the interference fringes described in the first embodiment are satisfied individually and independently for the interference fringes for the red light, the interference fringes for the green light, and the interference fringes for the blue light according to the present embodiment. An angle width of and an angular change in the angle of diffraction produced in the first diffraction, for example, for the red light is therefore at least partially canceled in the second diffraction. Similarly, an angle width of and an angular change in the angle of diffraction produced in the first diffraction for the green light is at least partially canceled in the second diffraction, and an angle width of and an angular change in the angle of diffraction produced in the first diffraction for the blue light is at least partially canceled in the second diffraction.

The order in which the hologram layer 351R, the hologram layer 351G, and the hologram layer 351B are stacked on each other is not limited to the stacking order shown in FIGS. 12A and 12B.

In the second embodiment described above, the same effects and advantages as those in the first embodiment are provided.

Third Embodiment

An image display apparatus according to a third embodiment of the invention will next be described.

Figure 13:
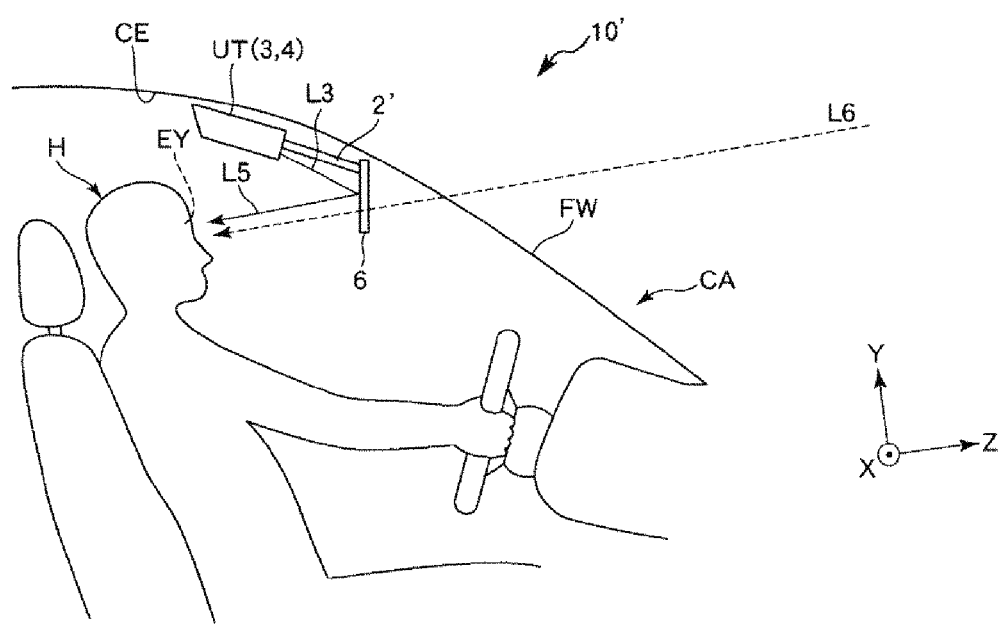
FIG. 13 diagrammatically shows a schematic configuration of a head-up display including an image display apparatus according to a third embodiment of the invention.

FIG. 13 diagrammatically shows a schematic configuration of a head-up display including the image display apparatus according to the third embodiment of the invention.

The third embodiment will be described below. In the following description, items different from those in the first and second embodiments described above will be primarily described and the same items as those in the first and second embodiment will not be described. Further, in FIG. 13, the same items as those in the embodiments described above have the same reference characters.

An image display apparatus 1 according to the third embodiment only differs from the image display apparatus 1 according to the first and second embodiments in that it is part of a head-up display 10' attached to a ceiling of a car for use.

That is, the image display apparatus 1 according to the third embodiment is attached to a ceiling portion CE of a car CA for use and allows a viewer to visually recognize a virtual image and an outside image superimposed on each other.

The image display apparatus 1 includes a light source unit UT, which has a built-in image generator 3 and expander optical system 4, a reflector 6, a frame 2', which connects the light source unit UT to the reflector 6, as shown in FIG. 13.

In the present embodiment, the description will be made of a case where the light source unit UT, the frame 2', and the reflector 6 are attached to the ceiling portion CE of the car CA, but these components may instead be attached onto a dashboard of the car CA, or part of the components may be fixed to a windshield FW. Further, the head-up display 10' may be installed in an airplane, a ship, a construction machine, a heavy machine, a motorcycle, a bicycle, a spacecraft, and a variety of other moving objects as well as a car.

Each of the components of the image display apparatus 1 will be sequentially described below in detail.

The light source unit UT may be fixed to the ceiling section CE in any manner and is fixed, for example, by using a method for attaching it to a sun visor with a band, a clip, or any other component.

The frame 2' includes, for example, a pair of elongated members, and the light source unit UT is connected to both X-axis ends of the reflector 6 to fix the light source unit UT to the reflector 6.

The light source unit UT has the image generator 3 and the expander optical system 4 built therein, and video light L3 is outputted from the expander optical system 4 toward the reflector 6. The video light L5 diffracted by and reflected off the reflector 6 is focused on the viewer's eye EY.

On the other hand, the reflector 6 according to the present embodiment also has the function of transmitting outside light L6 traveling from the region outside the reflector 6 toward the viewer's eye EY when the head-up display is used. That is, the reflector 6 has a function of reflecting the video light L3 from the light source unit UT and transmitting the outside light L6 traveling from the region outside the car CA through the windshield FW toward the viewer's eye EY. The viewer can thus visually recognize a virtual image (picture) formed by the video light L5 while visually recognizing an outside image at the same time. That is, a see-through-type head-up display is achieved.

In the thus configured third embodiment, the same effects and advantages as those in the first and second embodiments are provided.

That is, also in the image display apparatus 1 according to the present embodiment, an angle width of and an angular change in the angle of diffraction produced in the first diffraction can be at least partially canceled in the second diffraction. The viewer can thus visually recognize high-quality video images with a decrease in resolution and color shift sufficiently suppressed.

The image display apparatus according to the embodiments of the invention have been described above with reference to the drawings, but the invention is not limited thereto.

For example, in the image display apparatus according to the embodiments of the invention, the configuration of each of the portions can be replaced with an arbitrary configuration having the same function. Further, any other arbitrary configuration may be added to the embodiments of the invention.

Further, the image display apparatus according to the embodiments of the invention are not limited to the head-mounted display and the head-up display described above and can be accommodated in any form having a display principle based on a retina sweeping method.

The entire disclosure of Japanese Patent Application No. 2014-248119, filed Dec. 8, 2014 is expressly incorporated by reference herein.

What is claimed is:

1. An image display apparatus comprising:
an image light generator that generates video light modulated based on a video signal;
a first diffractive optical element that diffracts the video light outputted from the image light generator;
an optical scanner that spatially scans the video light; and
a second diffractive optical element on which the video light scanned by the optical scanner is incident and which diffracts the incident video light,
wherein the first diffractive optical element is provided on an optical path between the image light generator and the optical scanner,
wherein the optical scanner performs primary scanning of the video light along a first direction, and the optical scanner performs secondary scanning of the video light along a second direction perpendicular to the first direction,
the first diffractive optical element has a fixed diffraction grating cycle,
the second diffractive optical element has portions where diffraction grating cycles differ from each other on a scan line of the primary scanning that passes through a center of the secondary scanning of the video light to be incident on the second diffractive optical element, and
wherein the fixed diffraction grating cycle of the first diffractive optical element is an intermediate value between a maximum diffraction grating cycle and a minimum diffraction grating cycle on the scan line of the primary scanning that passes through the center of the secondary scanning of the video light to be incident on the second diffractive optical element.

2. The image display apparatus according to claim 1, wherein the second diffractive optical element has a surface on which the video light is incident, and the surface has a concave shape in a direction perpendicular to a diffraction grating of the second diffractive optical element.

3. The image display apparatus according to claim 1,
wherein the fixed diffraction grating cycle of the first diffractive optical element is equal to the diffraction grating cycle not only on the scan line of the primary scanning that passes through the center of the secondary scanning of the video light to be incident on the second diffractive optical element but also in a position of a center of the primary scanning.

4. The image display apparatus according to claim 1,
wherein the fixed diffraction grating cycle of the first diffractive optical element is equal to an average of the diffraction grating cycles on the scan line of the primary scanning that passes through the center of the secondary scanning of the video light to be incident on the second diffractive optical element.

5. The image display apparatus according to claim 1,
wherein the direction in which a diffraction grating of the second diffractive optical element extends is perpendicular to the first direction.

6. The image display apparatus according to claim 1,
further comprising a pupil expander optical system provided on an optical path between the optical scanner and the second diffractive optical element.

7. An image display apparatus comprising:
an image light generator that generates video light modulated based on a video signal;
a first diffractive optical element that diffracts the video light outputted from the image light generator;
an optical scanner that spatially scans the video light; and
a second diffractive optical element on which the video light scanned by the optical scanner is incident and which diffracts the incident video light,
wherein the first diffractive optical element is provided on an optical path between the image light generator and the optical scanner,
wherein the optical scanner performs primary scanning of the video light along a first direction, and the optical scanner performs secondary scanning of the video light along a second direction perpendicular to the first direction,
the first diffractive optical element has a fixed diffraction grating cycle, and
the second diffractive optical element has portions where diffraction grating cycles differ from each other on a scan line of the primary scanning that passes through a center of the secondary scanning of the video light to be incident on the second diffractive optical element, and
wherein the fixed diffraction grating cycle of the first diffractive optical element is equal to the diffraction grating cycle not only on the scan line of the primary scanning that passes through the center of the secondary scanning of the video light to be incident on the second diffractive optical element but also in a position of a center of the primary scanning.

8. The image display apparatus according to claim 7,
wherein the second diffractive optical element has a surface on which the video light is incident, and the surface has a concave shape in a direction perpendicular to a diffraction grating of the second diffractive optical element.

9. The image display apparatus according to claim 7,
wherein the direction in which a diffraction grating of the second diffractive optical element extends is perpendicular to the first direction.

10. The image display apparatus according to claim 7,
further comprising:
a pupil expander optical system provided on an optical path between the optical scanner and the second diffractive optical element.

11. An image display apparatus comprising:
an image light generator that generates video light modulated based on a video signal;
a first diffractive optical element that diffracts the video light outputted from the image light generator;
an optical scanner that spatially scans the video light; and
a second diffractive optical element on which the video light scanned by the optical scanner is incident and which diffracts the incident video light,
wherein the first diffractive optical element is provided on an optical path between the image light generator and the optical scanner,
wherein the optical scanner performs primary scanning of the video light along a first direction, and the optical scanner performs secondary scanning of the video light along a second direction perpendicular to the first direction,
the first diffractive optical element has a fixed diffraction grating cycle,
the second diffractive optical element has portions where diffraction grating cycles differ from each other on a scan line of the primary scanning that passes through a center of the secondary scanning of the video light to be incident on the second diffractive optical element, and
wherein the fixed diffraction grating cycle of the first diffractive optical element is equal to an average of the diffraction grating cycles on the scan line of the primary scanning that passes through the center of the secondary scanning of the video light to be incident on the second diffractive optical element.

12. The image display apparatus according to claim 11,
wherein the second diffractive optical element has a surface on which the video light is incident, and the surface has a concave shape in a direction perpendicular to a diffraction grating of the second diffractive optical element.

13. The image display apparatus according to claim 11,
wherein the direction in which a diffraction grating of the second diffractive optical element extends is perpendicular to the first direction.

14. The image display apparatus according to claim 11,
further comprising:
a pupil expander optical system provided on an optical path between the optical scanner and the second diffractive optical element.

* * * * *